(12) United States Patent
Tejima

(10) Patent No.: US 7,258,346 B2
(45) Date of Patent: *Aug. 21, 2007

(54) SLIDING ELEMENT

(75) Inventor: Yoshihiro Tejima, Saitama (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/017,098

(22) Filed: Dec. 21, 2004

(65) Prior Publication Data

US 2005/0212217 A1   Sep. 29, 2005

(30) Foreign Application Priority Data

Dec. 22, 2003   (JP) .............................. 2003-425577

(51) Int. Cl.
*F16J 15/34* (2006.01)
(52) U.S. Cl. ....................................... 277/399; 277/400
(58) Field of Classification Search ......... 277/399–400
See application file for complete search history.

(56) References Cited

U.S. PATENT DOCUMENTS

| | | | | |
|---|---|---|---|---|
| 3,109,658 A | * | 11/1963 | Barrett et al. ................ | 277/400 |
| 4,645,414 A | * | 2/1987 | DeHart et al. ................ | 415/83 |
| 5,092,612 A | * | 3/1992 | Victor et al. ................ | 277/400 |
| 5,664,787 A | * | 9/1997 | Fuse et al. ................... | 277/400 |
| 6,142,478 A | * | 11/2000 | Pecht et al. ................. | 277/400 |
| 6,152,452 A | * | 11/2000 | Wang .......................... | 277/400 |
| 6,705,844 B2 | * | 3/2004 | Englander ................ | 417/423.4 |
| 6,902,168 B2 | * | 6/2005 | Tejima ........................ | 277/399 |

* cited by examiner

*Primary Examiner*—Vishal Patel
(74) *Attorney, Agent, or Firm*—Arent Fox LLP

(57) ABSTRACT

A primary objective of a sliding element of the present invention is to decrease a friction coefficient of the sliding face and to improve seal performance thereof. The sliding element comprises a first dam section (6) which is configured in an annular form on the sliding face (2), a second dimple section (3A) which has a form of a narrow groove and makes an inclination angle (β) being measured from the dam section (6) in a direction of rotation pointing toward the sealed fluid, a suction means (3) which includes an annularly arranged array of the second dimple sections (3A), a first dimple section (4A) which has a form of a narrow groove and makes an inclination angle (α) being measured from the dam section (6) in a direction of rotation pointing an opposite direction relative to the suction means (3), a discharge means (4) which includes an annularly arranged array of the first dimple sections (4A), and a seal face (7) which is disposed in a peripheral surface adjacent to the discharge means (4) and in the opposite side relative to the dam section (6).

6 Claims, 26 Drawing Sheets

FIG. 21
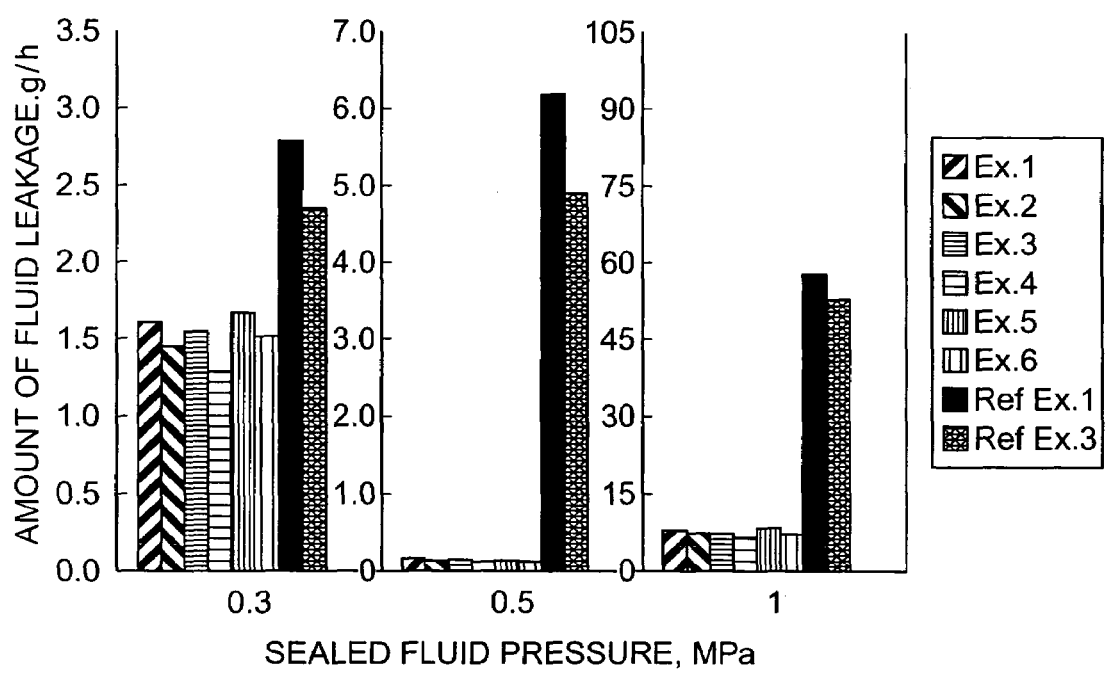

SLIDING ELEMENT

BACKGROUND OF THE INVENTION

1. Field of the Invention

The present invention relates generally to a technical domain of a sliding element engaging a relative rotational motion. More particularly, the invention relates to a sliding element which reduces a friction coefficient on the sliding face and prevents a sealed fluid from leaking from the sliding face.

2. Description of the Related Art

There has been an increasing demand for a variety of machines nowadays which involve a high-speed rotary shaft as well as a high-pressure fluid therein such as in a compressor or turbine engine. These machines are more likely to rely on sliding elements in sliding portions thereof. The sliding elements employed therein need to have sliding faces which are capable of not only effecting seal against the sealed fluid but also exhibiting durability against a high-speed rotary motion. Therefore, from the viewpoint of a bearing functionality, the sliding element needs to bear a sliding face of high anti-wear ability and to retain lubricant fluid for decreasing the friction coefficient thereof. From the viewpoint of a seal ring of mechanical seal, the sliding element needs not only decrease the friction coefficient of the sliding face but also improve the seal performance thereof in order to effect seal against the sealed fluid under a high pressure.

There is a ring seal shown in FIG. 25 as a prior art 1 related to the present invention which is a sliding element of a mechanical seal having a double spiral groove thereon (for example, refer to FIG. 7 of U.S. Pat. No. 6,341,782B1). Ring seal 100 shown in FIG. 25 illustrates a frontal view of a seal face 101 thereof. The ring seal 100 assembled in pair constitutes a mechanical seal. A pair of the ring seals 100 in the mechanical seal consist of a rotary ring seal and a stationary ring seal. A relative sliding motion between the rotary ring seal 100 and the stationary ring seal provides seal against the sealed fluid which is fed from axially one side in the space defined between a rotary shaft 140 and a housing 150.

The seal face 101 of the ring seal 100 disposes an annular groove 115 near an inner circumferential surface 102. In addition, the seal face 101 disposes counter-flow pumping grooves 110 which take a spiral form extending inward from an outer circumferential surface 103 along the rotational direction of the rotary shaft 140 and communicating with the annular grooves 115. Likewise, pro-flow pumping grooves 111 are disposed thereon which also take a spiral form extending from the outer circumferential surface 103 and communicating with the counter-flow pumping grooves 110 on their way. Flows along the counter-flow pumping groove 110 and the pro-flow pumping groove 111, indicated by the pointing arrows A and B, respectively, meet at an intersection point 112. These counter-flow pumping grooves 110 and pro-flow pumping grooves 111 are arranged in an equally spaced manner on the seal surface 101. Namely, the counter-flow pumping grooves 110 form a plurality of spiral grooves on the seal face 101 and the pro-flow pumping grooves 111 coming from the outer circumferential surface 103 communicate with the counter-flow pumping grooves 110, which give a circulatory flow of the sealed fluid on the seal face 101. This ring seal 100 is fixed with a sleeve 130 which is fitted to the rotary shaft 140, thus rotating with the rotary shaft 140.

The ring seal 100 thus configured is brought into a non-contact state because of dynamic pressure induced by the spiral counter-flow pumping groove 110 when the seal ring 100 is subjected to a relative rotary movement between the seal face 101 and its opposing seal face, which decreases its seal capability. Also the circulation of the seal fluid over the entire area of the seal face 101 due to the fluid paths provided by the counter-flow pumping groove 110 and the pro-flow pumping groove 111, as indicated by the pointed arrows, implies presence of a possible leakage of the fluid through a dam portion 104 toward the opposite direction of the fluid. Such leaked fluid from the dam portion 104 toward the inner circumferential side is never fed back to the circulation path. This is another cause of damage to the seal capability.

There is a ring seal 200 as a second prior art 2 related to the present invention as shown in FIG. 26 (see FIG. 5 of U.S. Pat. No. 6,152,452, for example). This ring seal 200 is typically employed as a stationary ring seal or a rotary seal ring of a mechanical seal. Seal face 207 of the ring seal 200 disposes spiral grooves 201, 202 thereat. Out of the spiral grooves 201, 202, the outer circumferential region defined by two radii R3 and R4 includes high-pressure spiral grooves 201 which have a spiral form extending toward the outer circumferential direction. The inner circumferential region, on the other hand, defined by two radii R1 and R2 includes low-pressure spiral grooves 202 which also have a circumferential, spiral form. Disposed between the high-pressure spiral grooves 201 and the low-pressure spiral grooves 202 is a flat plain portion 206.

The high-pressure spiral groove 201 has a spiral form with a large line width and a very shallow depth when viewed from the top in order to bring the seal face 207 into a non-contact state by dragging in the sealed fluid. Therefore, when the ring seal 200 rotates, the fluid dragged in by the high-pressure spiral grooves 201 brings the seal face 207 into a non-contact state due to dynamic pressure generated thereat. It, however, has been known that the fluid leakage is likely to occur from the seal face 207 to the atmospheric side during the transition to the non-contact state. This deteriorates the seal capability of the seal face 207 as a matter of course. Even if the low-pressure spiral grooves 202 are introduced in the inner circumferential region of the seal face 207, the situation will not improve as long as the high-pressure spiral grooves 201 play a major role to bring the seal face 207 into a non-contact state by dragging in the sealed fluid. That is, the fluid leakage can hardly be prevented. In particular, the low-pressure spiral grooves 202 thus arranged, spiral curves defined in the region formed by the two radii R1 and R2, cannot provide the fluid with a significant pumping capability. More in particular, the fact that the adjacent low-pressure spiral grooves 202 lie side by side along the radial direction and the radius of the spiral grooves is more or less similar to the radius of the seal face 207, i.e., a small spiral angle with respect to the tangential line of rotation, only reveals a minor contribution of the adjacent low-pressure spiral grooves 202 to the pumping action against the fluid. In addition, a very small depth of groove such as no more than 1 micrometer imposes difficulties on accurate fabrication of the grooves and thereby affects resulting seal capability thereof.

As described above, it is apparently difficult to improve the seal capability with a non-contact face seal as disclosed in the prior art 2 wherein conventional high-pressure spiral grooves 201 are merely augmented by low-pressure spiral grooves 202 in the circumferential region of the seal face 207. In other words, because the seal face 207 serves as a non-contact seal, it can decrease the friction coefficient thereat but leaves a lot of room for improvement from the viewpoint of seal capability thereof.

The present invention is made to alleviate the above problems. A primary technical goal which this invention tries to achieve is not only to decrease the friction coefficient of sliding surfaces but also to improve seal capability thereof against sealed fluid by utilizing the fluid dragged onto the sliding surfaces. Another technical goal is to prevent heat generation on the sliding surfaces. Yet another technical goal is to enhance durability of the sliding surfaces by preventing their wear.

BRIEF SUMMARY OF THE INVENTION

The present invention is made to alleviate the above technical problems and a solution to such problems is embodied as follows.

A sliding element related to the present invention is a sliding element that keeps a sealed fluid on a sliding face thereof wherein the sliding element is arranged slidable relative to another sliding element and the sealed fluid is located in either inner circumferential side or outer circumferential side of the sliding face. The sliding element comprises a first dam section which is configured in an annular form on the sliding face, a second dimple section which has a form of nearly a straight, narrow groove and makes an inclination angle being measured from the dam section in a direction of rotation pointing toward the sealed fluid, a suction means which includes an annularly arranged array of the second dimple sections, a first dimple section which has a form of nearly a straight, narrow groove and makes an inclination angle being measured from the dam section in a direction of rotation pointing an opposite direction relative to the suction means, a discharge means which includes an annularly arranged array of the first dimple sections, and a seal face which is disposed in a peripheral surface adjacent to the discharge means and in the opposite side relative to the dam section.

According to a sliding element related to the present invention, a sealed fluid is introduced into a sliding face of the sliding element by means of a suction means which is disposed on the sliding face and a discharge means provides the fluid with a pumping action toward the direction of the suction means such that the fluid is effectively retained on the sliding face for outstanding seal capability. Also the friction coefficient of the sliding face is decreased simultaneously. Furthermore, the first dam section contributes the improvement of the seal capability by preventing a pair of the mating sliding faces from falling in a non-contact state with a large clearance therebetween, which is achieved by regulating the amount of the sealed fluid being introduced onto the sliding face. In addition, the first dimple section generates a counter-flow pumping action against the sealed fluid in order to keep the sealed fluid off from the seal face, and the seal face prevents the sealed fluid from leaking from the sliding face to the exterior.

BRIEF DESCRIPTION OF THE DRAWINGS

FIG. 21 is a bar chart representing sealed fluid pressure versus fluid leakage obtained from the test results of the individual sliding elements 1 of the present invention and the other sliding elements, reference example 1 and reference example 3;

DETAILED DESCRIPTION OF THE INVENTION

Figure 1:
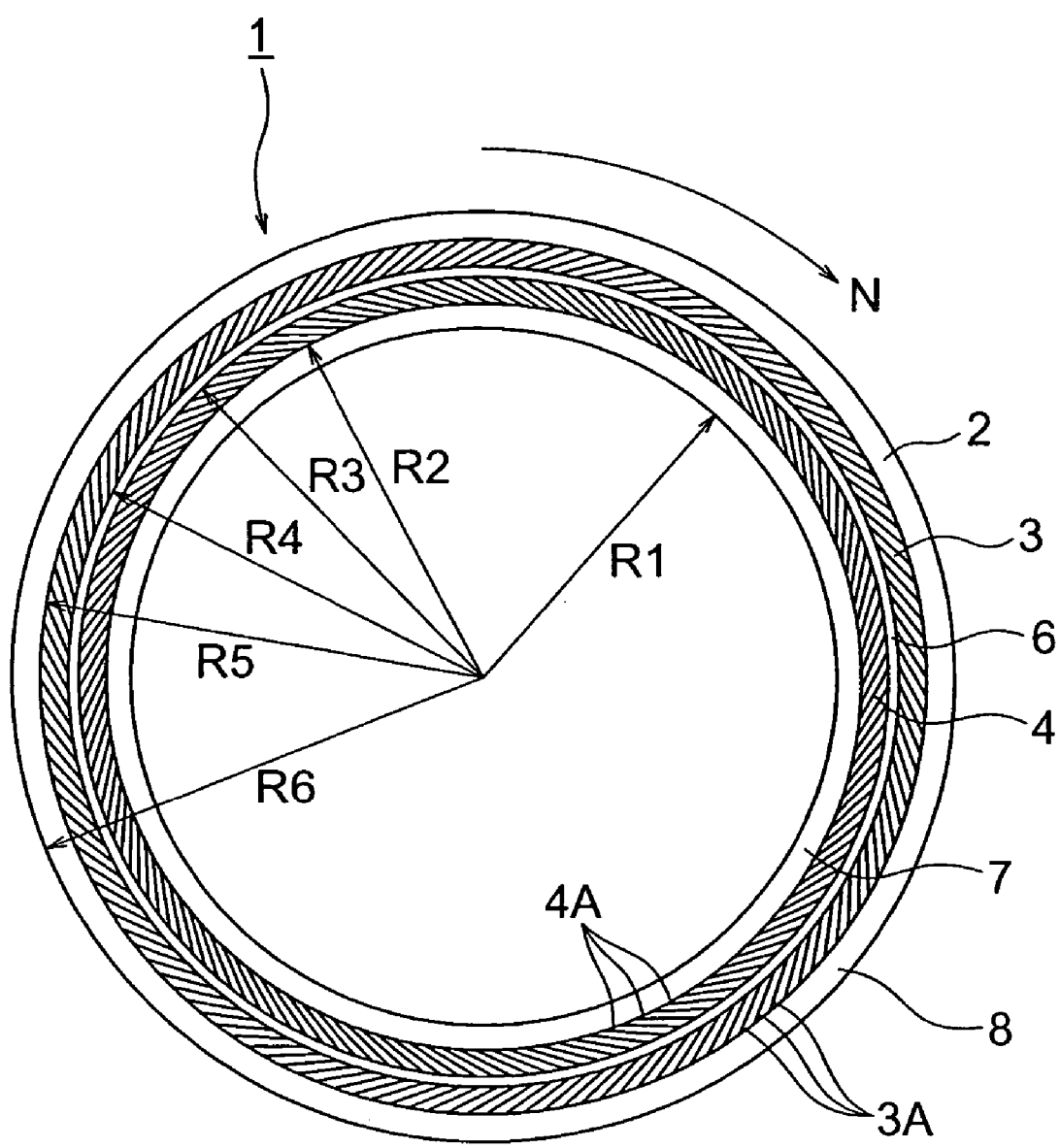
FIG. 1 is a front view of a sliding face of a sliding element representing a first preferred embodiment related to the present invention.
Figure 2:
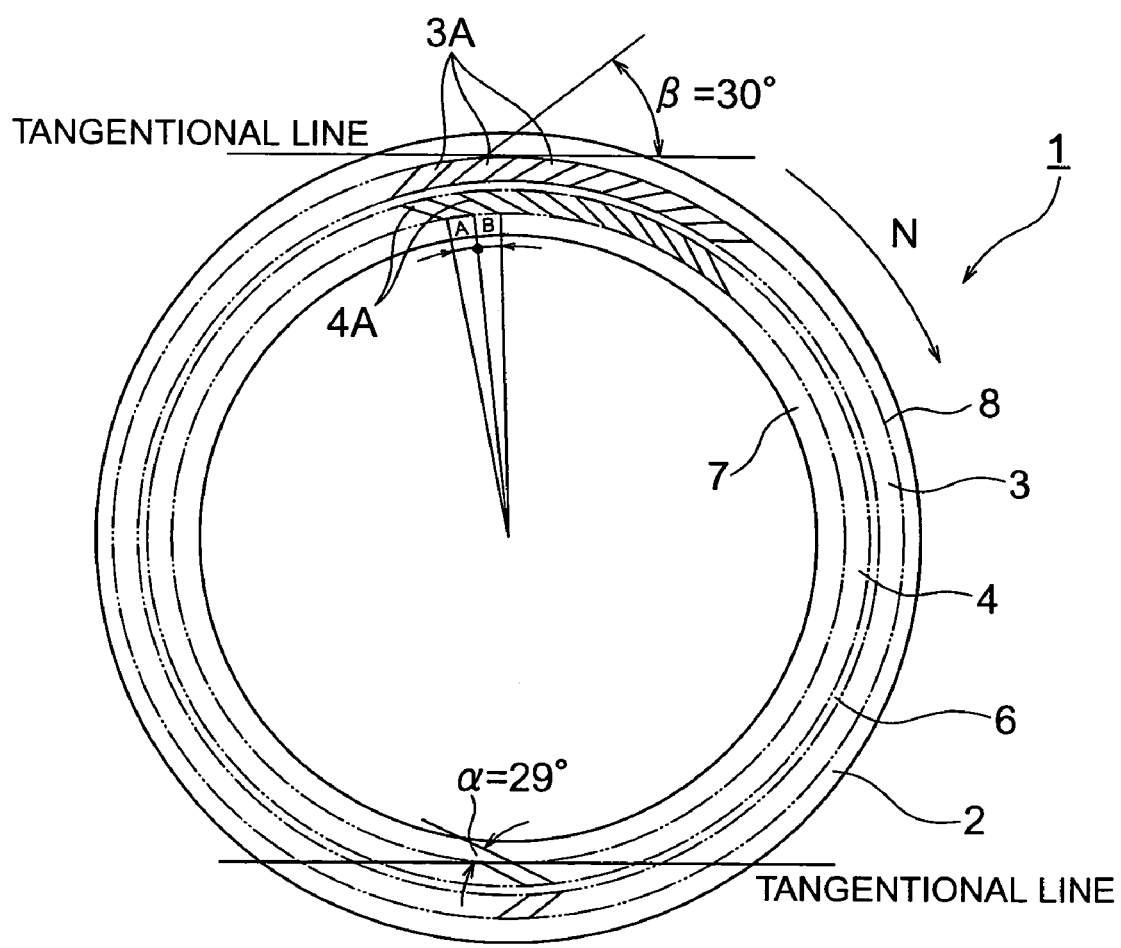
FIG. 2 is a front view of the sliding face shown in FIG. 1 wherein a portion of dimple section is emphasized in its details.

Described below is details of the figures of preferred embodiments of a sliding element of the present invention according to actual design drawings with accurate dimensional relations. FIG. 1 shows a sliding face 2 of a sliding element 1 as a first preferred embodiment of the present invention. FIG. 2 also shows an enlarged view of a portion of dimple sections in the sliding face 2 of the sliding element 1 of FIG. 1.

In FIG. 1 and FIG. 2, the sliding face (end face) 2 of the sliding element 1 having an annular form assumes the sealed fluid on either side of the inner perimeter side or the outer perimeter side (the latter case in FIG. 1). And the fluid can effectively be sealed by means of the sliding element 1. Suppose that this sliding element 1 be incorporated into a mechanical seal device 1. In this case, it should be used as a rotary seal ring 1 and be engaged with a stationary seal ring to form a pair. Therefore, the sliding face 2 of the rotary seal ring 1 is brought into seal contact with the mating sliding face of the opposing stationary seal ring in order to effect seal against the fluid. Also the sliding element 1 can be used as a shaft bearing which sustains sliding motion relative to the rotary shaft while sealing lubricant oil to axially one side over the cylindrical surface of the sliding face.

This sliding element 1 has an annular form being made of silicon carbide and retains the sliding face 2 over either area of inner circumferential area or outer circumferential area. It is assumed, as shown in FIG. 1 and FIG. 2, that the annular member sustains clockwise rotation in the direction "N". First dimple section 4A is defined as a group of several elongated grooves which span from a dam section 6 to the inner circumferential direction and make an angle to the radial direction, being inclined towards the rotational direction "N" wherein the first dam section 6 is defined in a range of from a radius R3 to a radius R4. A plurality of the first dimple sections 4A being arranged in a ring form provide a discharge means 4. Similarly, second dimple section 3A is defined as a group of several elongated grooves being arranged along the circumference which span from the dam section 6 to the outer circumferential direction and make an angle towards the rotational direction "N". A plurality of the second dimple sections 3A being arranged in a ring form provide a suction means 3.

The discharge means 4 is disposed in a range of from radius R2 to radius R3. The sealed fluid is urged to discharge toward the outer circumferential direction by the discharge means 4. The area spanning from radius R1 to radius R2 defines a first seal face 7. This first seal face 7 sealingly prevents the fluid from leaking to the inner circumference. The suction means 4 is in a range of from radius R4 to radius R5. This suction means 3 introduces the fluid contained inside the apparatus onto the seal face 2 from the outer circumference thereof. Another area ranging from radius R5 to radius R6 defines a 0-th dam section 8 which is the same surface as the sliding face (plane) 2. This 0-th dam section 8 not only prevents a potential damage of the tip portion of the second dimple section 3A but also controls an excessive introduction of the fluid onto the seal face 2.

Inclination angle α of the first dimple section 4A is 29 degrees with respect to the tangential line of the first dam section 6 pointing to the rotational direction. This inclination angle α can be chosen within the range of from 8 to 80 degrees, more preferably from 15 to 55 degrees. Likewise, inclination angle β of the second dimple section 3A is 30 degrees with respect to the tangential line of the first dam section 6 pointing to the rotational direction. The inclination angle β can be chosen within the range of from 8 to 80 degrees, more preferably from 15 to 55 degrees. Although the inclination angle α of the first dimple section 4A relative to the tangential line of the first dam section 6 may be chosen to be identical with the inclination angle β of the second dimple section 3A relative to the tangential line of the first dam section 6, α should preferably be smaller than β.

Groove width of the first dimple section 4A is defined by a dimension "A" which is measured along the circumference as shown in FIG. 2. Similarly, a gap between two adjacent first dimple sections 4A, 4A is defined by a dimension "B" which is measured along the circumference. Although FIG. 2 assumes A=B, it can also be arranged that every groove width gradually increases in its outward radial direction wherein the shape of the groove is trapezoidal and its dimension is determined by the longitudinal dimension of the first dimple section 4A and the radius R3. As a default, the groove width is assumed to be more or less uniform along the longitudinal dimension of inclination. However, it can be arranged to gradually expand toward the outer circumferential direction. The groove width assumes $250 \times 10^{-6}$ m in FIG. 2, and it is advised to be in the range of from $25 \times 10^{-6}$ to $1000 \times 10^{-6}$ m. Also the groove depth in FIG. 2 assumes $8 \times 10^{-6}$ m and its suggested range is from $1 \times 10^{-6}$ to $25 \times 10^{-6}$ m, more preferably from $3 \times 10^{-6}$ to $22 \times 10^{-6}$ m. These dimensions of the groove width are determined based on the assumption that the outer diameter R6 of the sliding face 2 is 40 mm. Therefore, these values should vary according to the size of the sliding face 2. As far as the minimum depth is concerned, there is a practical limitation from a viewpoint of the currently available machining technology, and that is how the minimum depth value is determined.

If the gap B between two adjacent dimples is assumed to be more or less constant in the first dimple section 4A and the second dimple section 3A, then it amounts to that the groove width of the first dimple section 4A and the second dimple section 3A gradually increases in its outward radial direction. Under this circumstance, the first dimple section 4A and the second dimple section 3A exhibit better discharge operation (discharge means) and better suction operation (suction means), respectively. The tapered portions of the first dimple section 4A and the second dimple section 3A form a straight line. Alternatively, the tapered portions can be arranged to form a circular arc, but not a spiral curve, which is close to a straight line. This form of the first dimple section 4A and the second dimple section 3A keeps the mating sliding faces 2 from being brought into non-contact state with a large gap therebetween due to a dynamic pressure acted on the sealed fluid. Conventional spiral groove suffers from poor seal capability of the sliding face 2 due to fluid leakage form the sliding face at the starting or stopping, since a wide clearance is created between the mating sliding faces under its non-contact situation.

Figure 3:
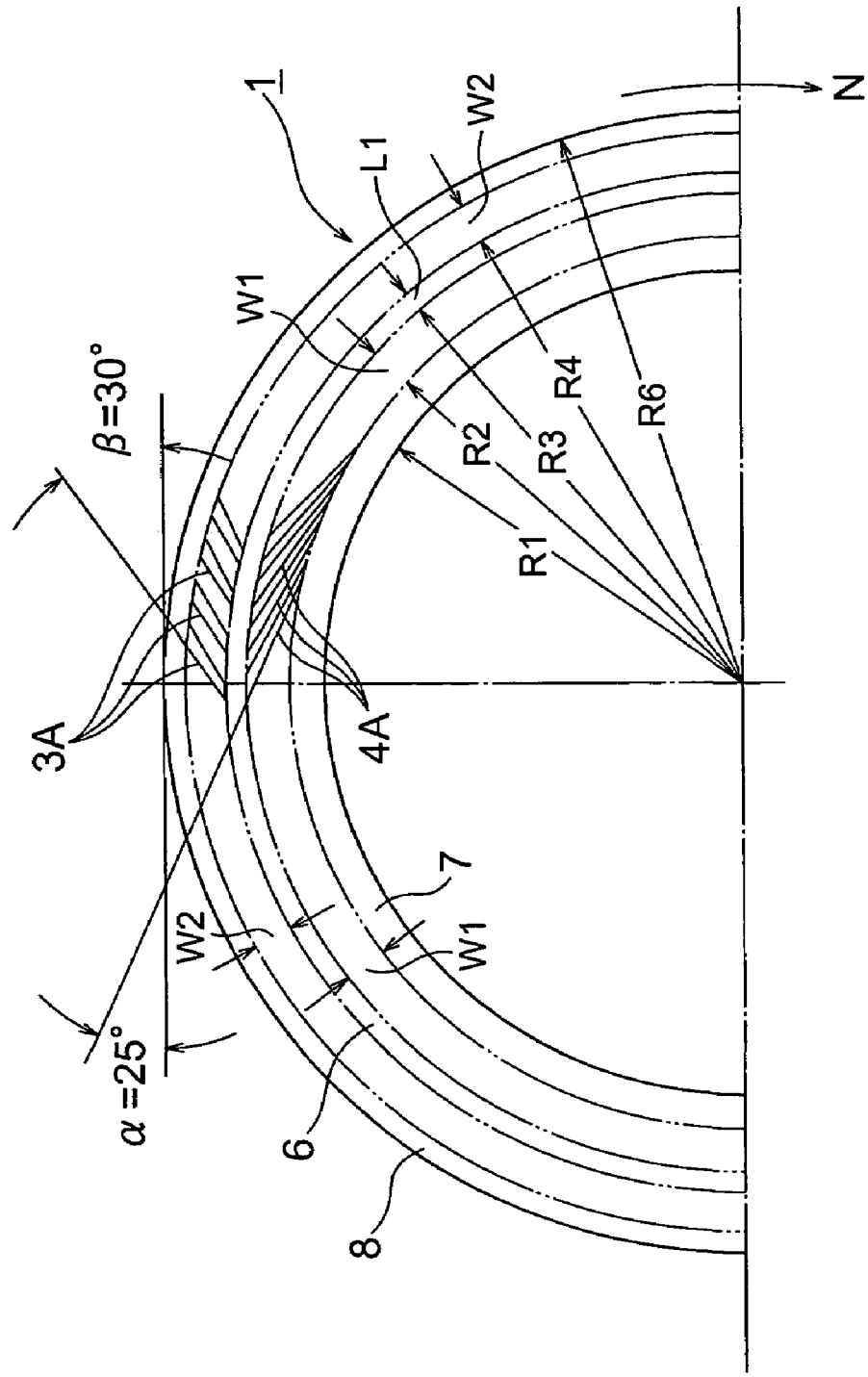
FIG. 3 is a front view of a sliding face of a sliding element representing a second preferred embodiment related to the present invention.
Figure 4:
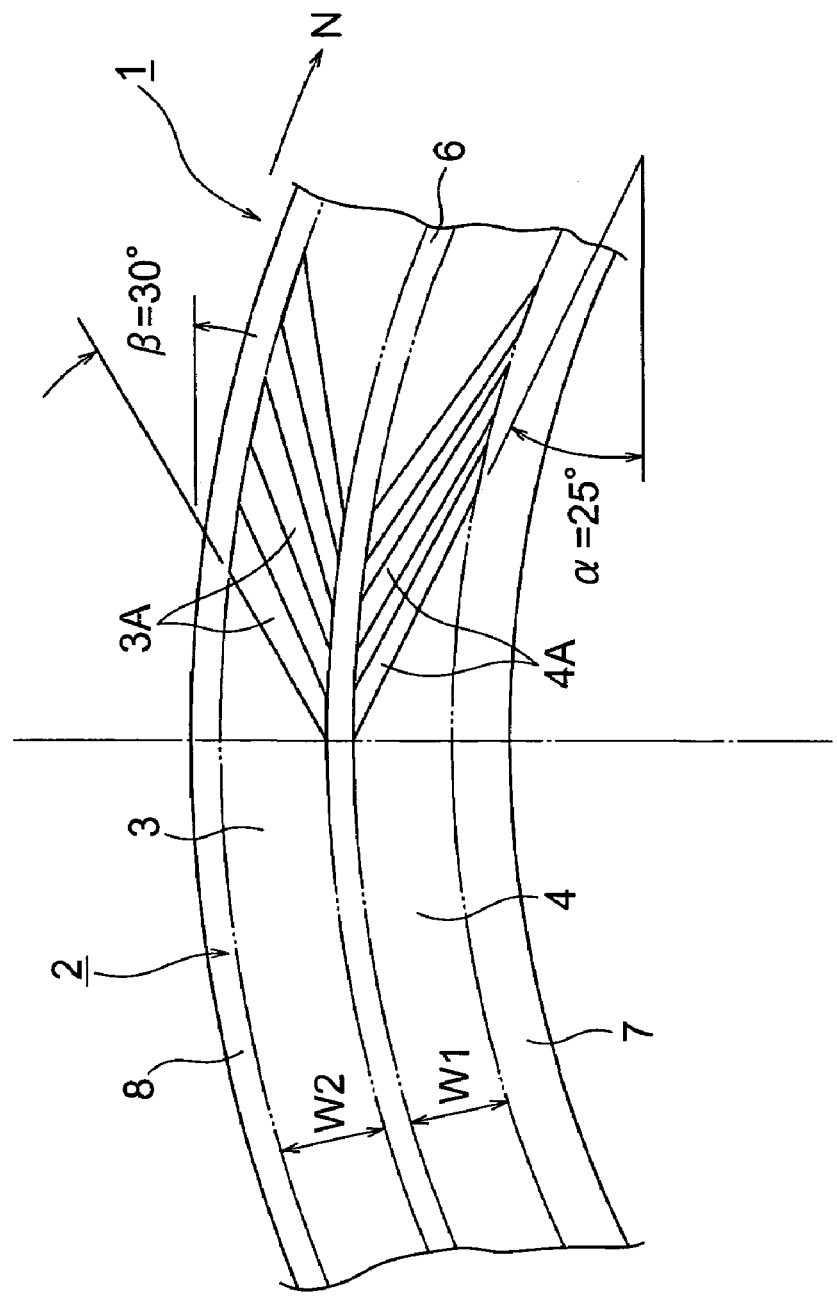
FIG. 4 is an enlarged front view of a portion of the sliding face shown in FIG. 3.

FIG. 3 and FIG. 4 show a sliding face 2 of a sliding element 1 as a second preferred embodiment of the present invention. This sliding element 1 is made of silicon carbide. FIG. 4 also shows an enlarged view of the first dimple section 4A and the second dimple section 3A of FIG. 1. As shown in FIG. 3 and FIG. 4, the first dimple section 4A and the second dimple section 3A on the sliding face 2 are elongate grooves in a straight form. The first dimple section 4A makes an angle of $\alpha=25$ degrees while the second dimple section 3A makes an angle of $\beta=30$ degrees. As the outer diameters of the first dimple section 4A and the second dimple section 3A become larger, the groove width should be increased accordingly. The outmost groove width here is chosen to be $250\times10^{-6}$ m, and it is suggested to be in the range of from $25\times10^{-6}$ to $1000\times10^{-6}$ m. Also the groove depth assumes $5\times10^{-6}$ m and its suggested range is from $1\times10^{-6}$ to $25\times10^{-6}$ m, more preferably from $3\times10^{-6}$ to $22\times10^{-6}$ m.

The discharge means 4 operates in such a manner that the sealed fluid present between the mating sliding faces 2, 2 is discharged so as not to leak toward the inner circumferential side. Radial width "W1" of the discharge means 4 is defined by a distance between radius R2 and radius R3. The suction means 3 then introduces the fluid contained inside the apparatus into between the seal faces 2, 2. Radial width "W2" of the suction means 3 is defined by a distance between radius R4 and radius R5. Between the discharge means 4 and the suction means 3 is disposed a first dam section 6. The inner circumferential side of the discharge means 4 ranging from radius R1 to radius R2 constitutes a seal face 7 which effects seal against the fluid being present between the sliding faces.

Furthermore, the outer circumferential side of the suction means 3 ranging from radius R5 to radius R6 defines a 0-th dam section 8. This 0-th dam section 8 regulates an excessive introduction of the fluid contained inside the apparatus into the sliding face 2 as well as an outflow of the fluid from the sliding face 2. And the first dimple section 4A and the second dimple section 3A tend to become longer as the inclination angle $\alpha$ of the first dimple section 4A gets smaller. This causes the pumping action of the discharge means 4 to dominate the suction power of the suction means 3, resulting in improvement of the seal capability of the sliding face 2. Other configurations are more or less the same as those in FIG. 1 and FIG. 2 as indicated by the same reference numerals. The 0-th dam section 8 can be either disposed or omitted depending on the functional design of the sliding element 1.

Figure 5:
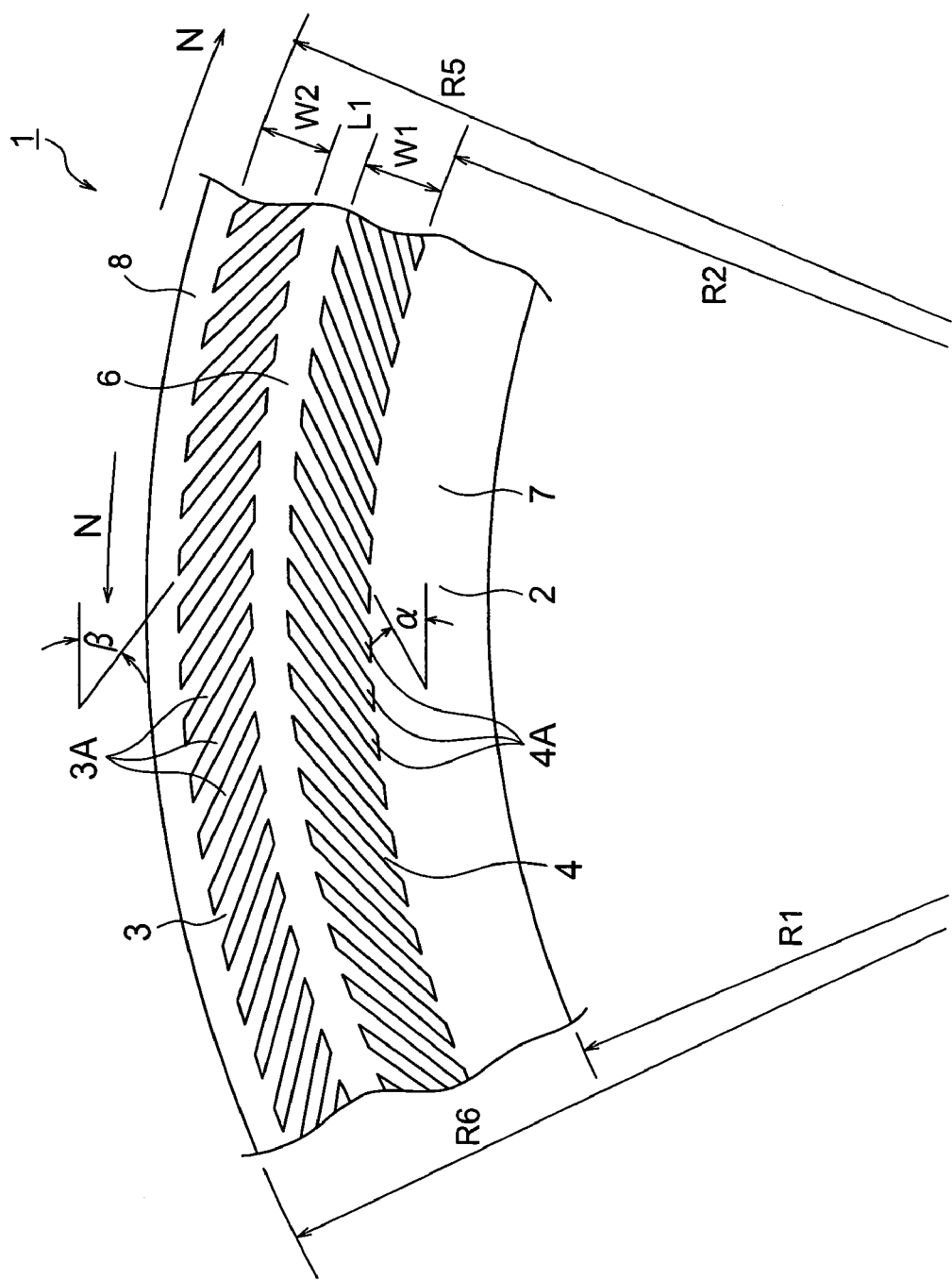
FIG. 5 is a front view of a portion of a sliding face of a sliding element representing a third preferred embodiment related to the present invention.

FIG. 5 is a magnified front view of a sliding face 2 of a sliding element 1 as a third preferred embodiment of the present invention, which is schematized based on an optical microscope photo. The sliding element 1 in FIG. 5 is made of silicon carbide. Its overall configuration is same as that of a sliding element 1 shown in FIG. 1. A major difference from FIG. 1 is how the first dimple section 4A and the second dimple section 3A are arranged. The first dimple section 4A is inclined inward by $\alpha=30$ degrees with respect to the tangential line pointing to the rotational direction. The second dimple section 3A, on the other hand, is inclined outward by $\beta=30$ degrees with respect to the tangential line pointing to the rotational direction. Although the inclination angle $\alpha$ of the first dimple section 4A is assumed to be the same as the inclination angle $\beta$ of the second dimple section 3A, $\alpha$ might as well be chosen smaller than $\beta$.

The first dimple section 4A and the second dimple section 3A make angles to the rotational direction "N" of the sliding face 2, extending along almost straight lines toward the inner perimeter and the outer perimeter, respectively. A plurality of the first dimple sections 4A are disposed along a circumference of the sliding face 2 defining a discharge means 4 while a plurality of the second dimple sections 3A are disposed along another circumference of the sliding face 2 defining a suction means 3. The discharge means 4 operates in such a manner that the sealed fluid present between the mating sliding faces 2, 2 is discharged so as not to leak toward the inner circumferential side. Radial width "W1" of the discharge means 4 is defined by a distance between radius R2 and radius R3. The suction means 3 then introduces the fluid contained inside the apparatus into between the seal faces 2, 2. Radial width "W2" of the suction means 3 is defined by a distance between radius R4 and radius R5. Between the discharge means 4 and the suction means 3 is disposed a first dam section 6. The inner circumferential side of the discharge means 4 ranging from radius R1 to radius R2 constitutes a seal face 7. Furthermore, the outer circumferential side of the suction means 3 ranging from radius R5 to radius R6 defines a 0-th dam section 8.

The first dimple section 4A is arranged longer than the second dimple section 3A. Groove width of the first dimple section 4A and the second dimple section 3A in FIG. 5 is both $250\times10^{-6}$ m. It, however, is suggested to be in the range of from $25\times10^{-6}$ m to $1000\times10^{-6}$ m. Also the groove depth in FIG. 5 assumes $6\times10^{-6}$ m and its suggested range is from $1\times10^{-6}$ to $25\times10^{-6}$ m, more preferably from $3\times10^{-6}$ m to $22\times10^{-6}$ m. A gap "L1" between the first dimple section 4A and the second dimple section 3A is $250\times10^{-6}$ m wherein the gap therebetween should be chosen in the range of from $50\times10^{-6}$ m to $1000\times10^{-6}$ m. These dimensions of the groove width and the gap are determined based on the assumption that the diameter of the sliding element 1 is approximately 40 mm. Therefore, a different choice in the diameter of the sliding element 1 should affect the dimensions and the above listed dimensions should be taken accordingly.

Sliding faces 2 which appear in FIG. 6 through FIG. 17 are based on the sliding faces 2 described in FIG. 1 through FIG. 5 wherein a pair of sliding faces 2, 2 of the sliding element 1 augmented with additional technology are assembled for evaluation purpose. The first dimple section 4A and the second dimple section 3A of the sliding face 2 introduced in FIG. 6 through FIG. 17 basically employ those previously described in FIG. 1 through FIG. 5. However, the dimple sections in FIG. 6 through FIG. 17 are somewhat exaggerated for an illustrative purpose. Although sealed fluid, in FIG. 6 through FIG. 17, is assumed to be located in the outer circumferential side relative to the sliding face 2, the current technology is also applicable to a case in which the sealed fluid is located in the inner circumferential side relative to the sliding face 2. Under such a circumstance, however, unless the first dimple section 4A and the second dimple section 3A are arranged symmetrical with respect to a boundary therebetween, the first dimple section 4A and the second dimple section 3A need to be swapped with one another.

Figure 6:
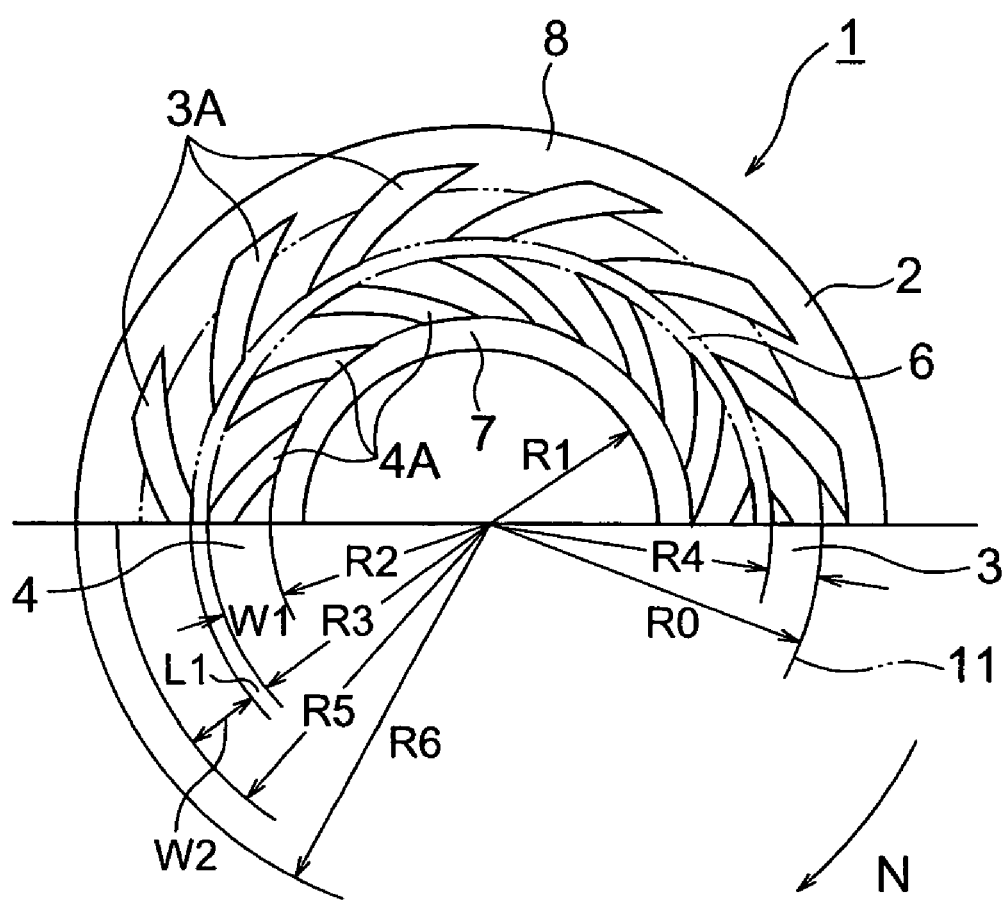
FIG. 6 is a front view of a pair of sliding faces being in seal contact with one another as a 1-A embodiment related to the present invention.

FIG. 6 is a front view of sliding face 2 as a 1-A embodiment related to the present invention. The area spanning from radius R1 to radius R2 defines a seal face 7. This seal face 7 sealingly prevents the fluid from leaking to the inner circumference. The distance "W1" between radius R2 and radius R3 defines the radial width of the discharge means 4. The discharge means 4 contains a first dimple section 4A which is in the form of a straight-line-like circular arc of a large diameter wherein the dimples are at an angle to the rotational direction in the radially inward direction. Groove width of the first dimple section 4A gradually widens toward its radially outward direction although the groove width may as well be set equal at the inner and outer circumferences. Also the distance between radius R4 and radius R5 defines the radial width of the suction means 3. The suction means 3 contains a second dimple section 3A which is in the form of a straight-line-like circular arc of a large diameter wherein the dimples are at an angle to the rotational direction in the radially outward direction. Groove width of the second dimple section 3A gradually widens toward its radially outward direction although the groove width may as well be set equal at the inner and outer circumferences.

Between the discharge means 4 and the suction means 3 is disposed a first dam section 6. Also an area of the sliding face 2 between radius R5 and radius R6 defines a 0-th dam section 8. The sliding face 2 has polished planes at the first dam section 6 and the 0-th dam section 8. And the first dimple section 4A and the second dimple section 3A as grooves provide the sliding face 2 with special functionality. Outer radius of the sliding face of a mating sliding element (not shown) which is mated with this sliding element 1 as a pair is R0. This implies that a suction means 3 corresponds to the width "W2" of the second dimple section 3A with which the mating sliding element is brought into contact. A portion of the second dimple section 3A which is disposed between radius R0 and radius R5 on the sliding face 2 serves as a passage to introduce the sealed fluid into the sliding face 2.

Figure 7:
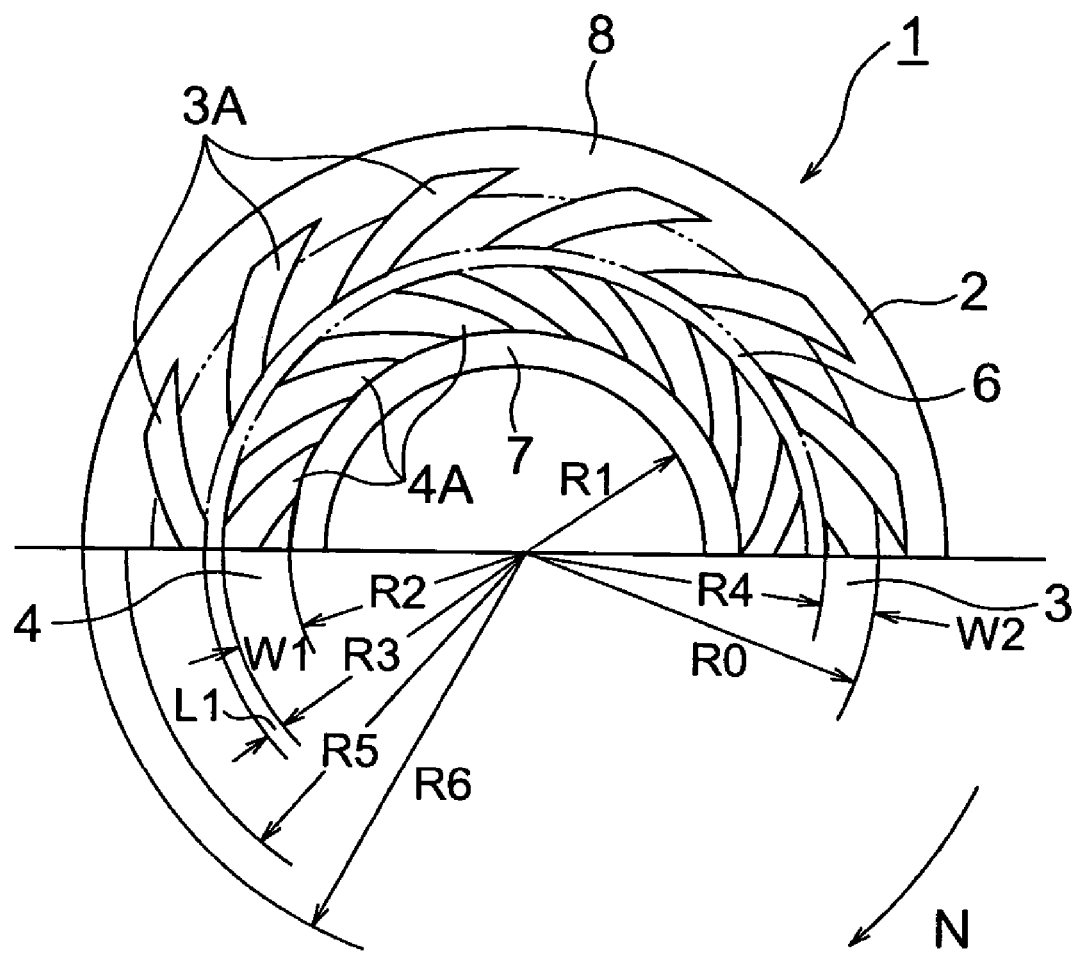
FIG. 7 is a front view of a pair of sliding faces being in seal contact with one another as a 1-B embodiment related to the present invention.

FIG. 7 is a front view of sliding face 2 as a 1-B embodiment related to the present invention. Sliding face 2 of the sliding element 1 shown in FIG. 7 is very similar to the sliding face 2 in FIG. 6. A major difference from FIG. 6 is that the first dimple section 4A is arranged along the circumference with a certain offset relative to the second dimple section 3A. The circumferential offset between the first dimple section 4A and the second dimple section 3A allows a reduction of the frictional coefficient by holding the sealed fluid on the sliding face 2 in an efficient manner. However, it is to be noted that the outer radius of the sliding face of a mating sliding element (not shown) which is mated with this sliding element 1 as a pair is R0 which is smaller than the outer radius R5 of the second dimple section 3A.

Figure 8:
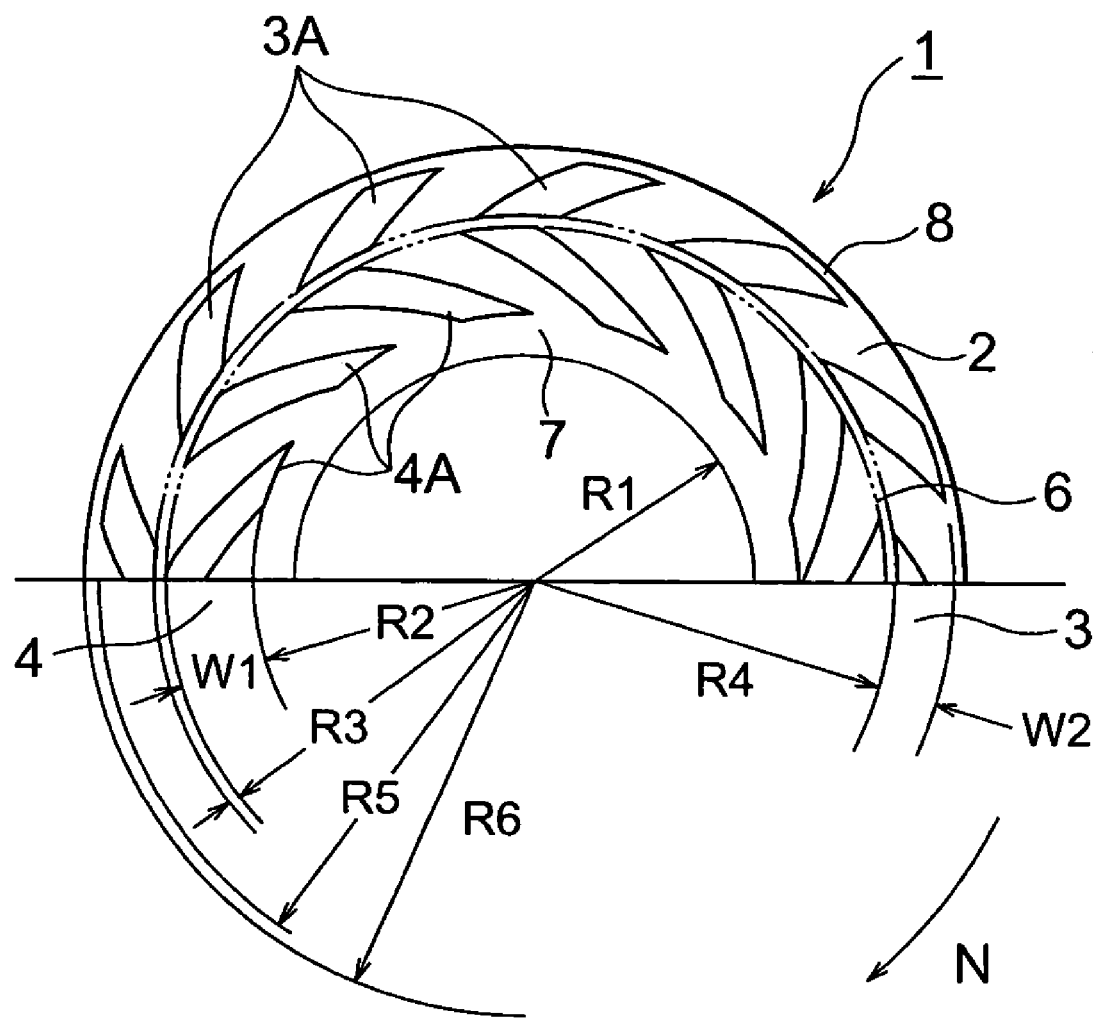
FIG. 8 is a front view of a pair of sliding faces being in seal contact with one another as a 2-A embodiment related to the present invention.

FIG. 8 is a front view of sliding face 2 as a 2-A embodiment related to the present invention. Sliding face 2 of the sliding element 1 shown in FIG. 8 is very similar to the sliding face 2 in FIG. 6. A major difference of the sliding face 2 in FIG. 8 relative to that in FIG. 6 is that the radius width of the 0-th dam section 8 is made smaller than that of the 0-th dam section in FIG. 6. Outer radius of the sliding face of a mating sliding element (not shown) which is mated with this sliding element 1 as a pair is R6. That is, both of the sliding faces of the two mating sliding elements have a same outer diameter. This causes the 0-th dam section 8 of the sliding element 1 to be brought into seal contact with the 0-th dam section of the sliding face of the mating sliding element. The sealed fluid, however, can be easily introduced therebetween, since the contact width of the 0-th dam sections is kept small. This sliding element 1 is more suitable for applications with low viscosity fluid. Also the resulting large area of the sliding face 2 is able to achieve a high seal capability.

Figure 9:
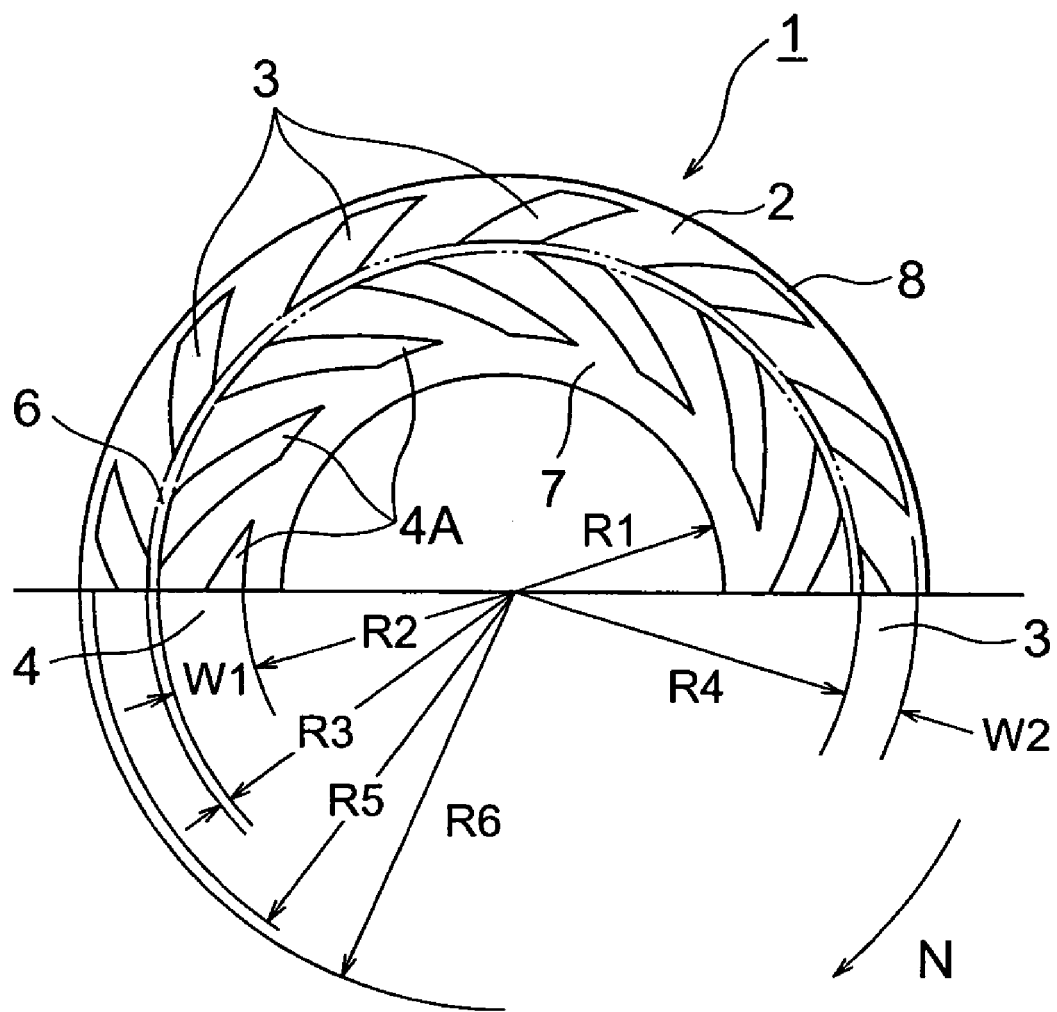
FIG. 9 is a front view of a pair of sliding faces being in seal contact with one another as a 2-B embodiment related to the present invention.

FIG. 9 is a front view of sliding face 2 as a 2-B embodiment related to the present invention. Sliding face 2 of the sliding element 1 shown in FIG. 9 is very similar to the sliding face 2 in FIG. 8. A major difference of the sliding face 2 in FIG. 9 relative to that in FIG. 8 is that the first dimple section 4A is arranged along the circumference with a certain offset relative to the second dimple section 3A. This sliding element 1 is more suitable for applications with low viscosity fluid. Also the resulting large area of the sliding face 2 is able to achieve a high seal capability. Outer radius of the sliding face of a mating sliding element (not shown) which is mated with this sliding element 1 as a pair is R6.

Figure 10:
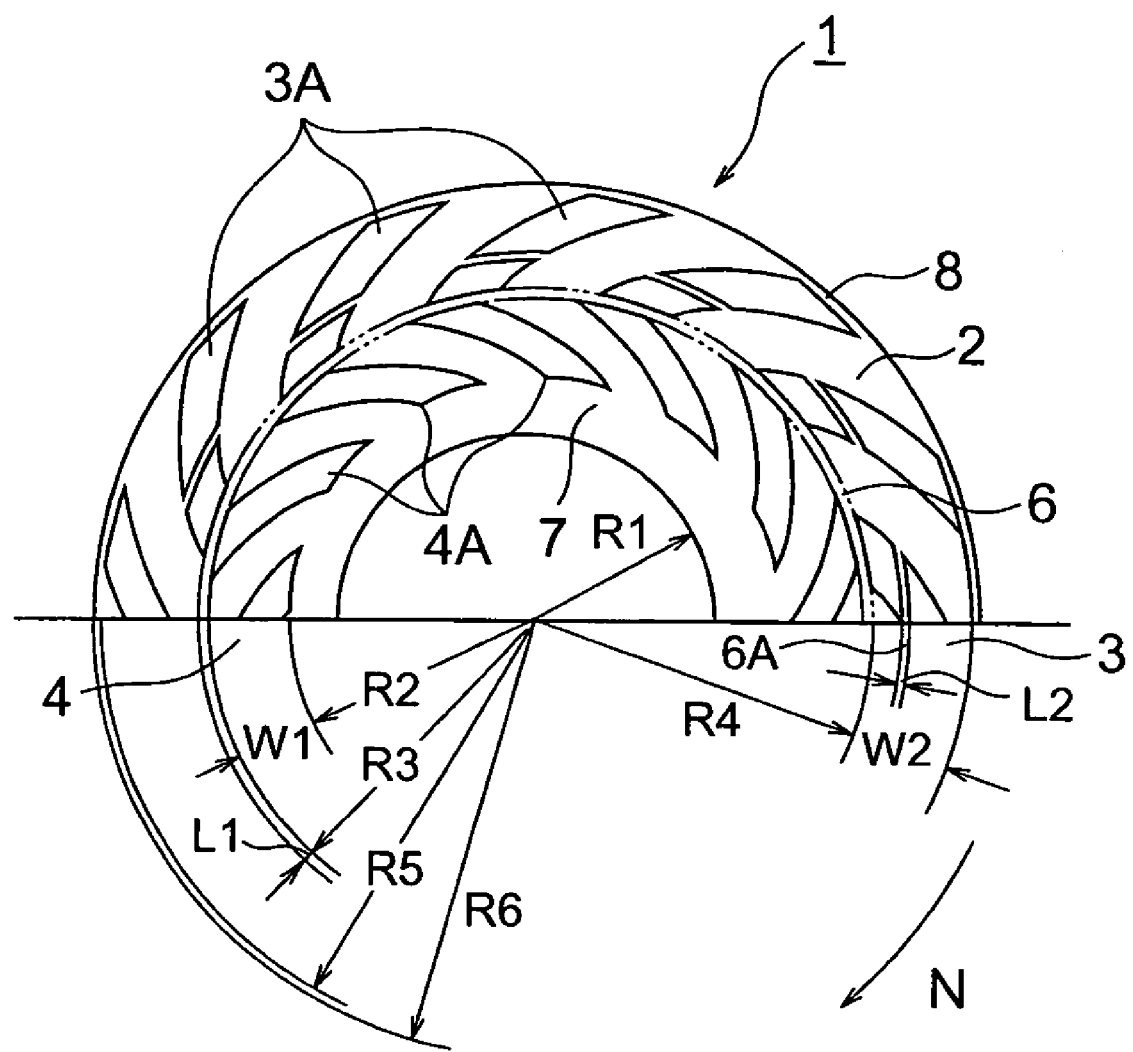
FIG. 10 is a front view of a pair of sliding faces being in seal contact with one another as a 3-A embodiment related to the present invention.

FIG. 10 is a front view of sliding face 2 as a 3-A embodiment related to the present invention. Sliding face 2 of the sliding element 1 shown in FIG. 10 is very similar to the sliding face 2 in FIG. 8. A major difference of the sliding face 2 in FIG. 10 relative to that in FIG. 8 is that a second dam section 6A is disposed midway in the second dimple section 3A wherein the second dam section 6A traverses the second dimple section 3A along the circumferential direction. The radial width "L2" of the second dam section 6A should preferably be arranged narrower than the radial width "L1" of the first dam section 6. This second dam section 6A provides more lubrication function to the sliding face 2 and improves seal capability thereof. Outer radius of the sliding face of a mating sliding element (not shown) which is mated with this sliding element 1 as a pair is R6.

Figure 11:
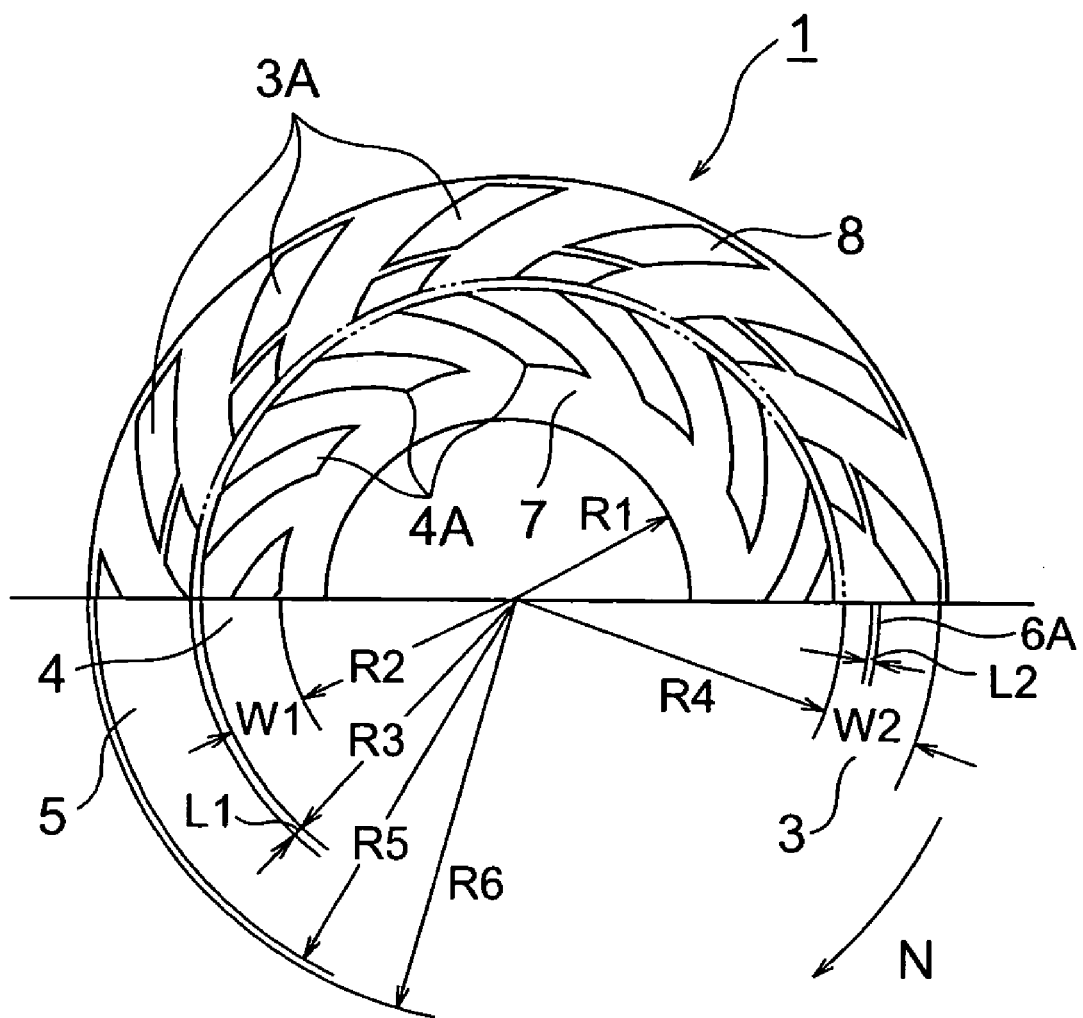
FIG. 11 is a front view of a pair of sliding faces being in seal contact with one another as a 3-B embodiment related to the present invention.

FIG. 11 is a front view of sliding face 2 as a 3-B embodiment related to the present invention. Sliding face 2 of the sliding element 1 shown in FIG. 11 is very similar to the sliding face 2 in FIG. 10. A major difference of the sliding face 2 in FIG. 11 relative to that in FIG. 10 is that the first dimple section 4A is arranged along the circumference with a certain offset relative to the second dimple section 3A. The circumferential offset thus arranged allows a reduction of the friction coefficient by holding the sealed fluid on the sliding face 2 in an efficient manner. Outer radius of the sliding face of a mating sliding element (not shown) which is mated with this sliding element 1 as a pair is R6.

Figure 12:
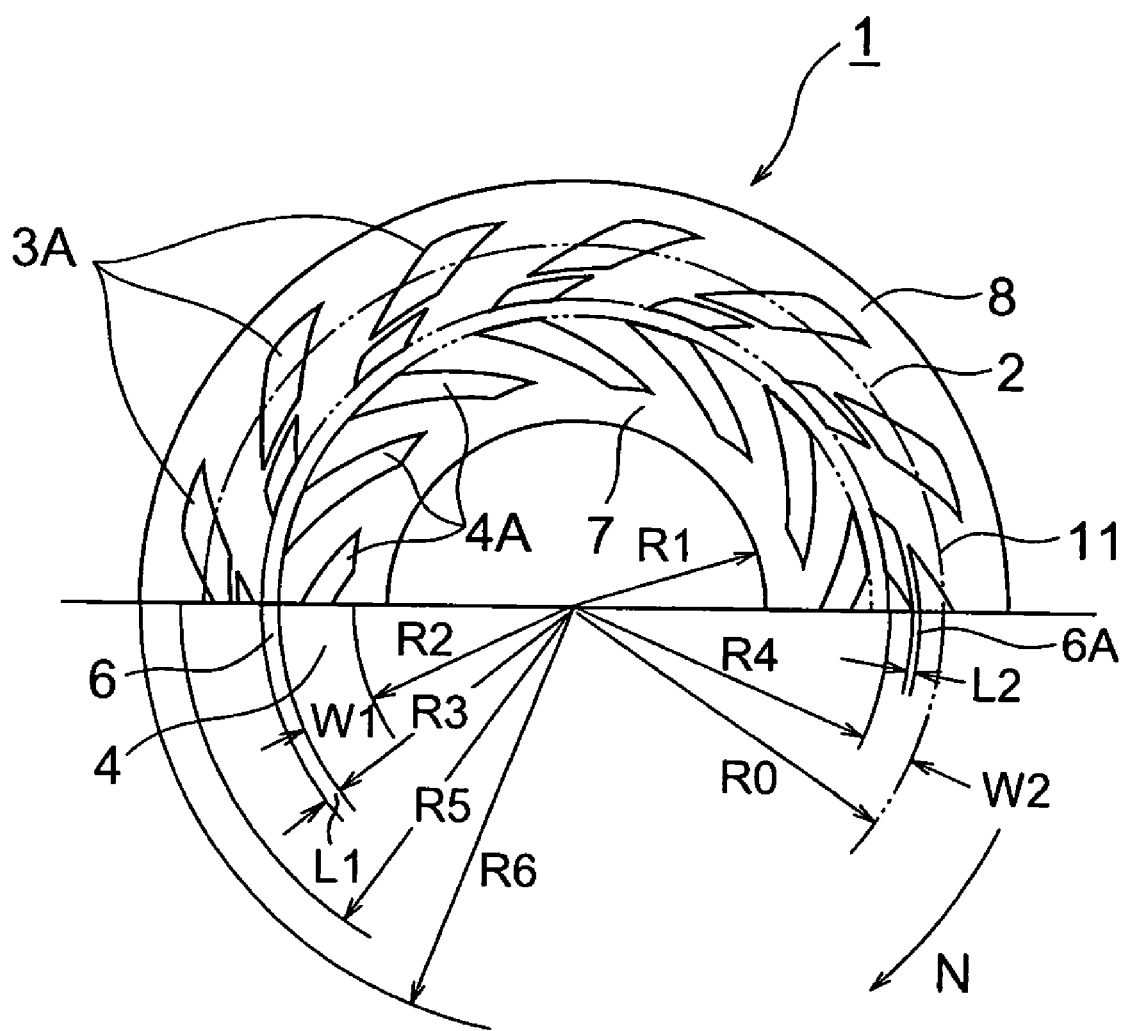
FIG. 12 is a front view of a pair of sliding faces being in seal contact with one another as a 4-A embodiment related to the present invention.

FIG. 12 is a front view of sliding face 2 as a 4-A embodiment related to the present invention. Sliding face 2 of the sliding element 1 shown in FIG. 12 is very similar to the sliding face 2 in FIG. 10. A major difference of the sliding face 2 in FIG. 12 relative to that in FIG. 10 is that the outer radius R0 of the sliding face of a mating sliding element (not shown) which is mated with this sliding element 1 is arranged smaller than the outer radius R5 of the second dimple section 3A wherein the sealed fluid is introduced from the outer radius R5 side of the second dimple section 3A. This configuration allows the sealed fluid not only to be introduced to the sliding face 2 and but also to be distributed over the sliding face 2 for a better lubrication function.

Figure 13:
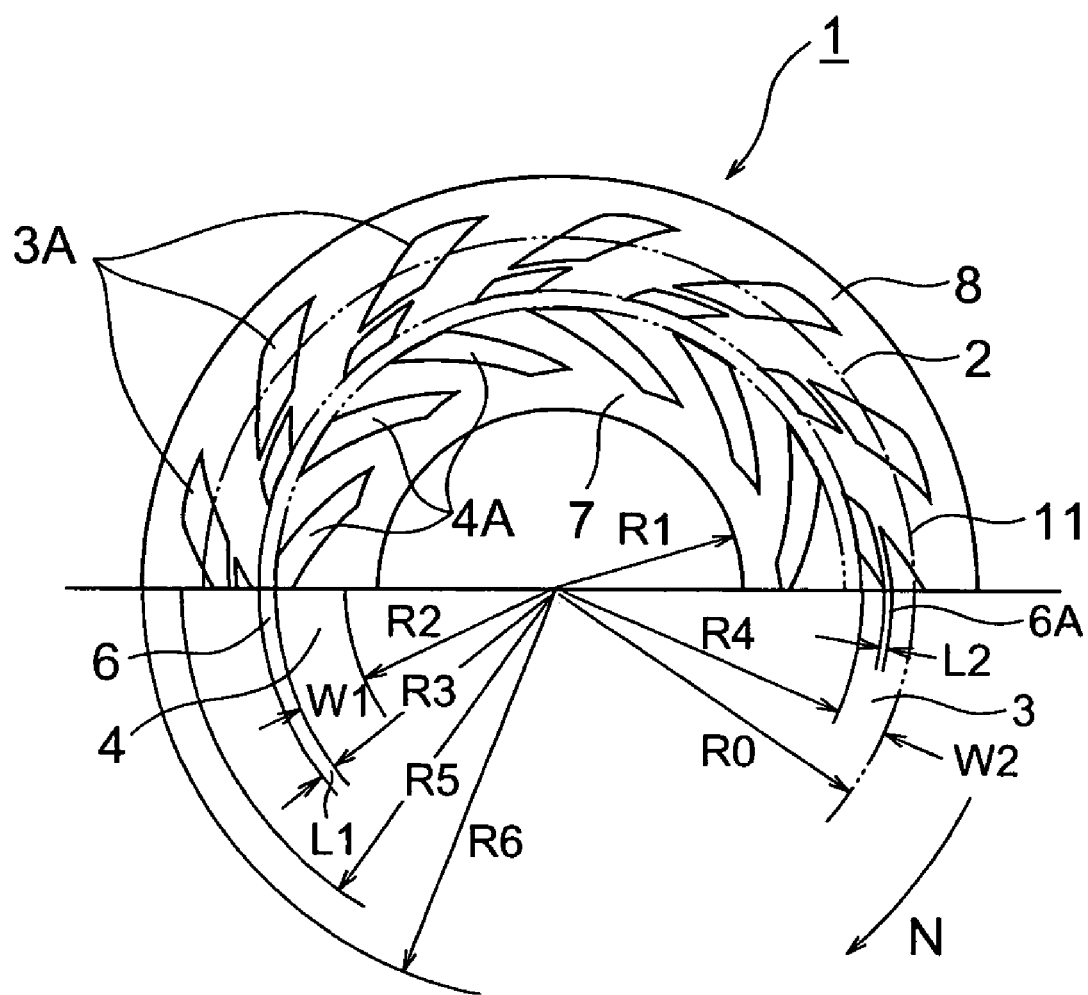
FIG. 13 is a front view of a pair of sliding faces being in seal contact with one another as a 4-B embodiment related to the present invention.

FIG. 13 is a front view of sliding face 2 as a 4-B embodiment related to the present invention. Sliding face 2 of the sliding element 1 shown in FIG. 13 is very similar to the sliding face 2 in FIG. 12. A major difference of the sliding face 2 in FIG. 13 relative to that in FIG. 12 is that the first dimple section 4A is arranged along the circumference with a certain offset relative to the second dimple section 3A. The circumferential offset thus arranged allows a reduction of the friction coefficient by holding the sealed fluid on the sliding face 2 in an efficient manner. Outer radius R0 of the sliding face of a mating sliding element (not shown) which is mated with this sliding element 1 is arranged smaller than the outer radius R5 of the second dimple section 3A.

Figure 14:
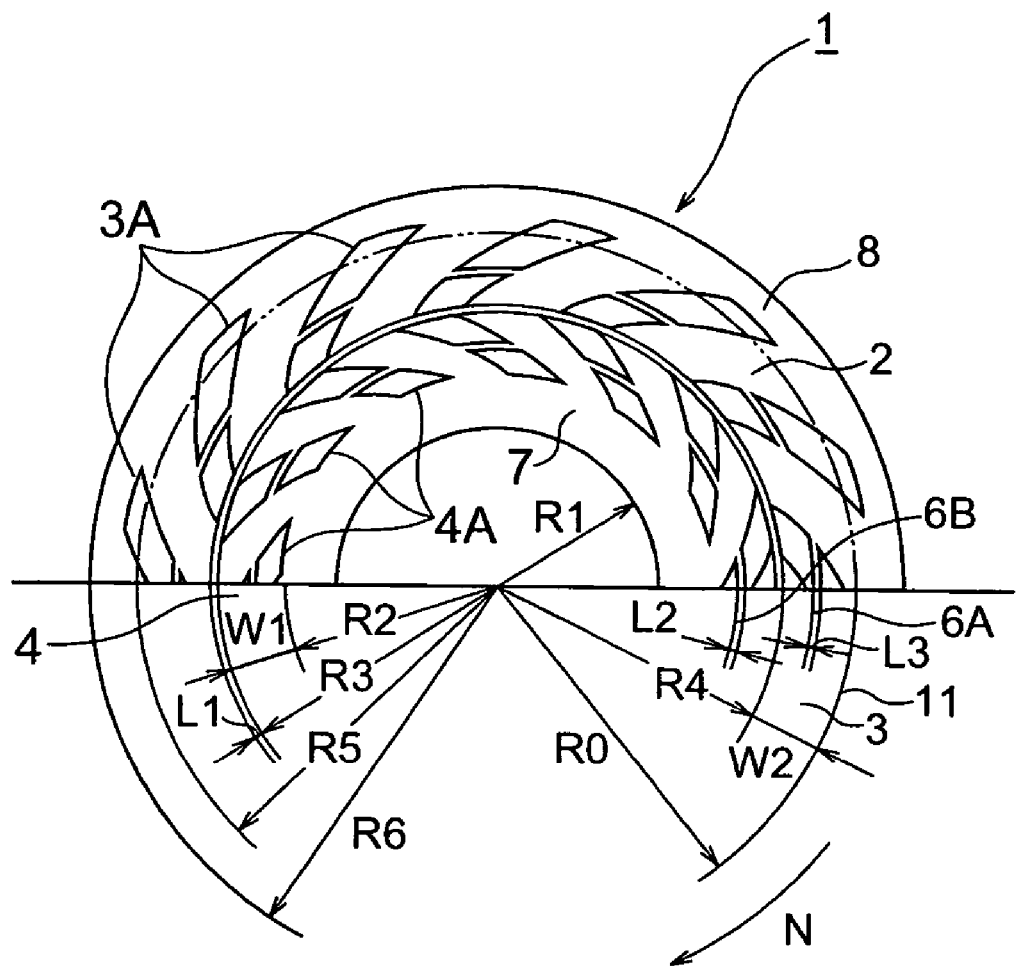
FIG. 14 is a front view of a pair of sliding faces being in seal contact with one another as a 5-A embodiment related to the present invention.

FIG. 14 is a front view of sliding face 2 as a 5-A embodiment related to the present invention. Sliding face 2 of the sliding element 1 shown in FIG. 14 is Very similar to the sliding face 2 in FIG. 12. A major difference of the sliding face 2 in FIG. 14 relative to that in FIG. 12 is that a third dam section 6B is disposed midway in the first dimple section 4A wherein the third dam section 6B traverses the first dimple section 4A along the circumferential direction.

The circumferential offset thus arranged allows a reduction of the friction coefficient by holding the sealed fluid on the sliding face 2 in an efficient manner. In addition, this arrangement prevents the sealed fluid on the sliding face 2 from leaking to the inner circumferential direction. Outer radius R0 of the sliding face of a mating sliding element (not shown) which is mated with this sliding element 1 is arranged smaller than the outer radius R5 of the second dimple section 3A.

Figure 15:
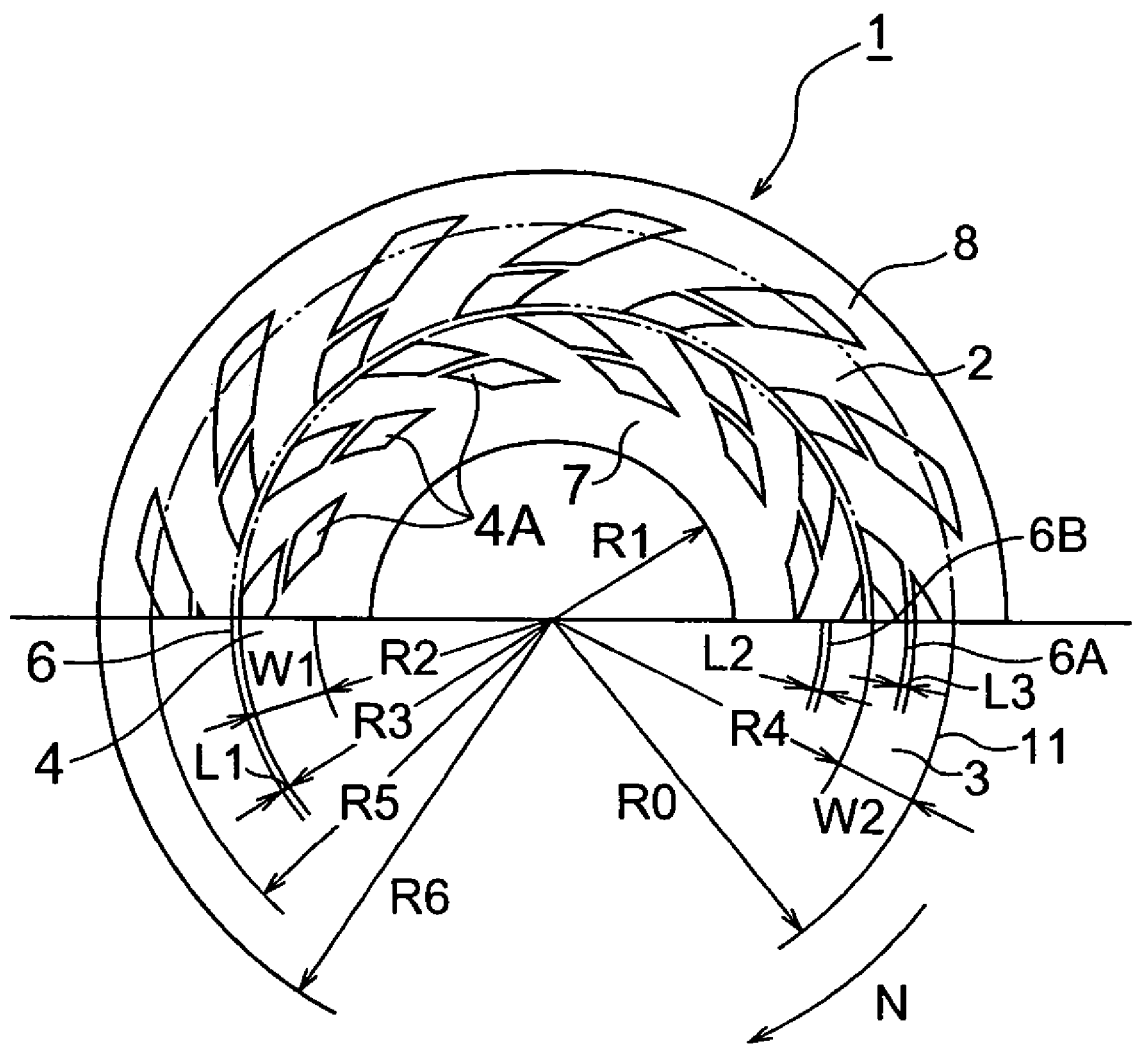
FIG. 15 is a front view of a pair of sliding faces being in seal contact with one another as a 5-B embodiment related to the present invention.

FIG. 15 is a front view of sliding face 2 as a 5-B embodiment related to the present invention. Sliding face 2 of the sliding element 1 shown in FIG. 15 is very similar to the sliding face 2 in FIG. 14. A major difference of the sliding face 2 in FIG. 15 relative to that in FIG. 14 is that the first dimple section 4A is arranged along the circumference with a certain offset relative to the second dimple section 3A. The circumferential offset thus arranged allows a reduction of the friction coefficient by holding the sealed fluid on the sliding face 2 in an efficient manner. Outer radius R0 of the sliding face of a mating sliding element (not shown) which is mated with this sliding element 1 is arranged smaller than the outer radius R5 of the second dimple section 3A.

The above mentioned sliding faces 2 of the sliding element 1 shown in FIG. 6 through FIG. 15 are subjected to experiments wherein the sliding face 2 is brought into contact with an oppositely facing sliding face, not shown, of a mating sliding element in order to keep off the sealed fluid in the outer circumference side wherein the mating sliding face is a polished plane surface.

Figure 16:
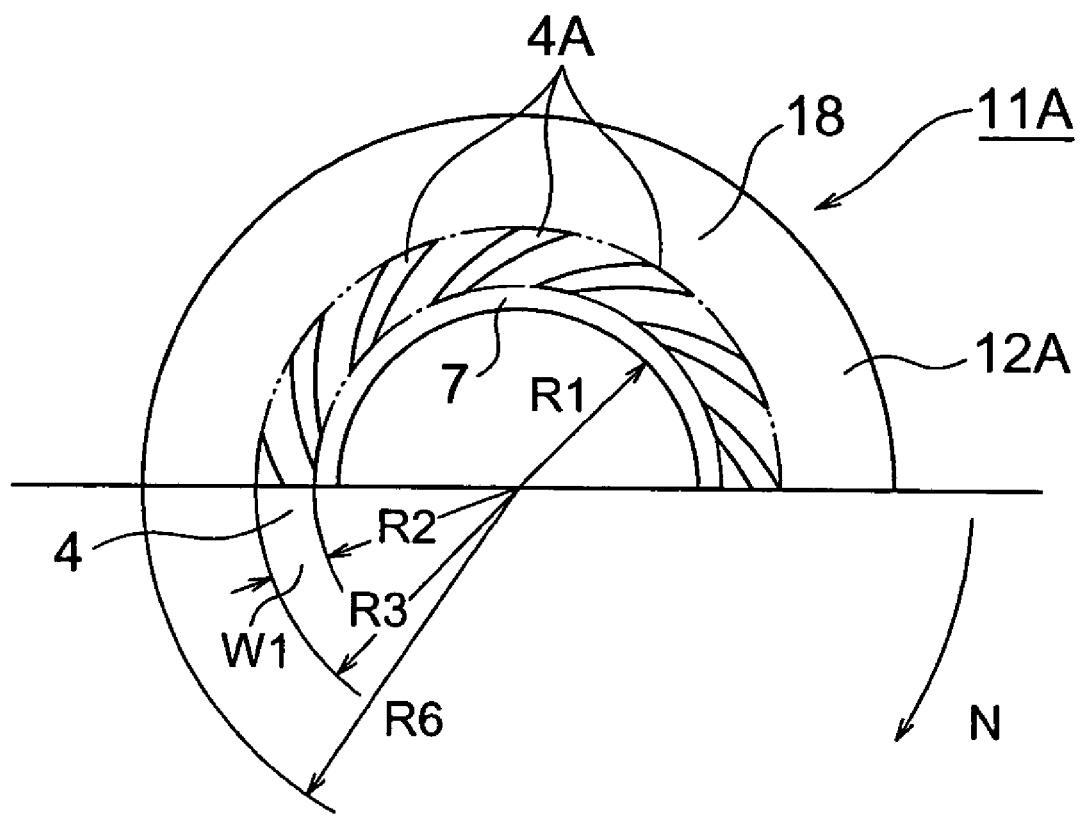
FIG. 16 is a front view of a sliding face as a 6-A embodiment related to the present invention.

FIG. 16 is a front view of sliding face 12A as a 6-A embodiment related to the present invention. Sliding element 11A shown in FIG. 16 serves as a discharge means 4 wherein several first dimple sections 4A are arranged in a ring form in the inner circumferential side of the sliding face 12A thereof. Although the first dimple section 4A of FIG. 16 is oriented in a different direction from the previous first dimple sections 4A given in FIG. 6 through FIG. 15, its dimensional parameters such as groove width, length and inclination angle are similar to those of the first dimple sections 4A in FIG. 6 through FIG. 15. Also within the discharge means 4 of the sliding face 12A is disposed a seal face 7. Further, outside the discharge means 4 of the sliding face 12A is disposed a 0-th dam section 18. This sliding element 11A comes to exhibit an outstanding seal capability as a combination with a sliding element 11B of FIG. 17. The circumferential area of the discharge means 4 is brought into contact with a seal face 17 shown in FIG. 17. Rotational direction "N" of the sliding element 11A given in FIG. 16 coincides with the rotational direction "N" of the mating sliding element 11B in FIG. 17.

Figure 17:
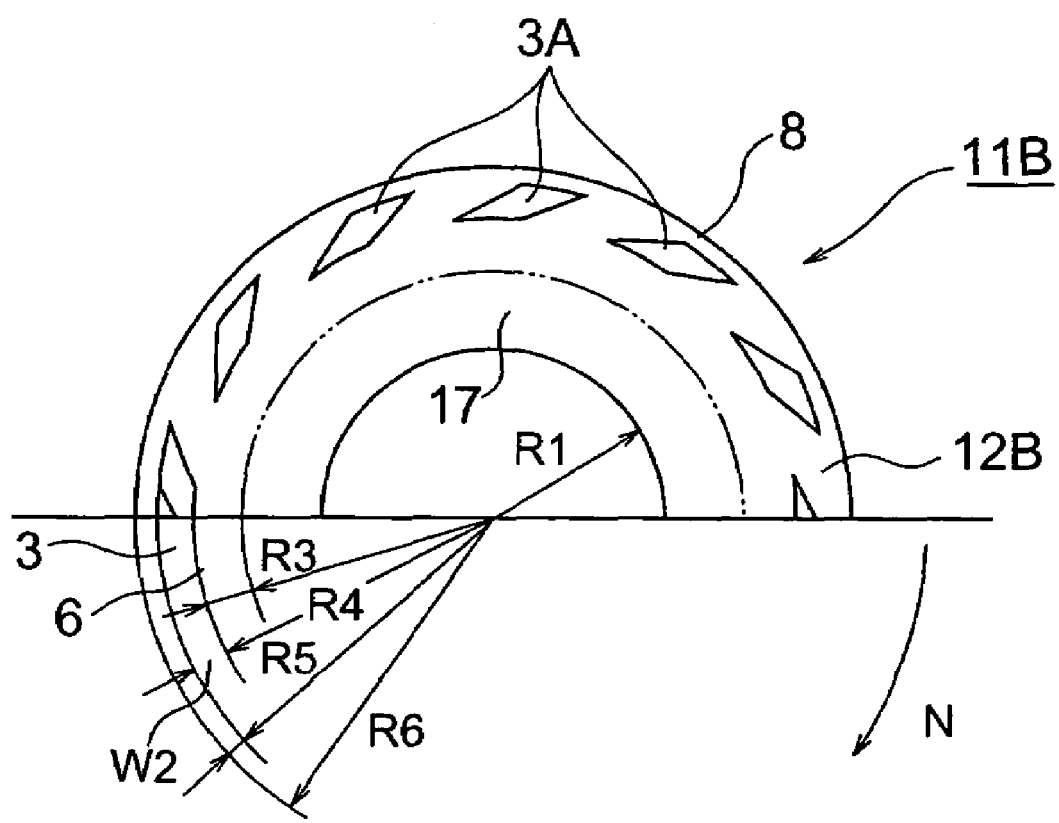
FIG. 17 is a front view of a sliding face as a 6-B embodiment related to the present invention.

FIG. 17 is a front view of sliding face 12B as a 6-B embodiment related to the present invention. Sliding element 11B shown in FIG. 17 serves as a suction means 3 wherein several second dimple sections 3A are arranged in a ring form in the outer circumferential side of the sliding face 12B thereof. Also within the suction means 3 of the sliding face 12B is disposed a seal face 17. Further, outside the suction means 3 of the sliding face 12B is disposed a 0-th dam section 8. This sliding element 11B comes to exhibit an outstanding seal capability as a combination with the sliding element 11A of FIG. 16. Note that the reference numeral 6 becomes a first dam section after being brought into contact with the sliding face 12A of FIG. 16. Also note that the circumferential area of the second dimple sections 3A is brought into contact with the 0-th dam section 18 of FIG. 16. Rotational direction "N" represents the rotational direction of the sliding element 11B.

The above mentioned sliding elements 1, 11A, 11B can be made of hard materials such as super hard alloy, silicon carbide, ceramics or the like. In particular, silicon carbide should be most suitable for the sliding elements 1, 11A, 11B. That is, not only superb strength but also enhanced durability of the sliding face can be assured for the sliding elements 1, 11A, 11B. In conventional sliding elements wherein a long spiral groove is employed, those being made of silicon carbide or the like tend to initiate damage at the spiral groove on the sliding face during its operation. Once the damage occurs to the sliding face, the damage propagates one after another. On the other hand, since the sliding elements 1, 11A, 11B of the present invention only allow a limited length for the individual dimple sections 4A, 3A, there are advantages that not only potential damage to the sliding faces 2, 12A, 12B is effectively prevented but also the seal capability can be improved due to the dimensional effect in the first dimple section 4A and the second dimple section 3A.

One of the methods for fabricating the dimple sections 4A, 3A on the sliding face 2 made of hard material is a sand blasting in which a photosensitive film for sand blasting is closely placed on the sliding face. In this method, a photosensitive film for sand blasting is placed on the sliding face 2 and a positive film on which arrays of dimples are printed is closely placed on the photosensitive film before the photosensitive film is subjected to an exposure. The photosensitive film then is developed and a subsequent sand blasting provides individual dimple sections 4A, 3A which are identical to those printed on the positive film.

Width of the rectangular grooves of the first dimple section 4A and the second dimple section 3A described above is in the range of from $25 \times 10^{-6}$ m to $1000 \times 10^{-6}$ m. Satisfactory performance has been verified with a specific width of $50 \times 10^{-6}$ m, $150 \times 10^{-6}$ m or $250 \times 10^{-6}$ m. Also the longitudinal length of the first dimple section 4A and the second dimple section 3A should be arranged such that it becomes more than five times compared with the groove width. Specific examples as the dimension include $1000 \times 10^{-6}$ m and $1600 \times 10^{-6}$ m. And the depth of the first dimple section 4A and the second dimple section 3A is in the range of from $1 \times 10^{-6}$ m to $25 \times 10^{-6}$ m, more preferably in the range from $3 \times 10^{-6}$ m to $22 \times 10^{-6}$ m.

Figure 18:
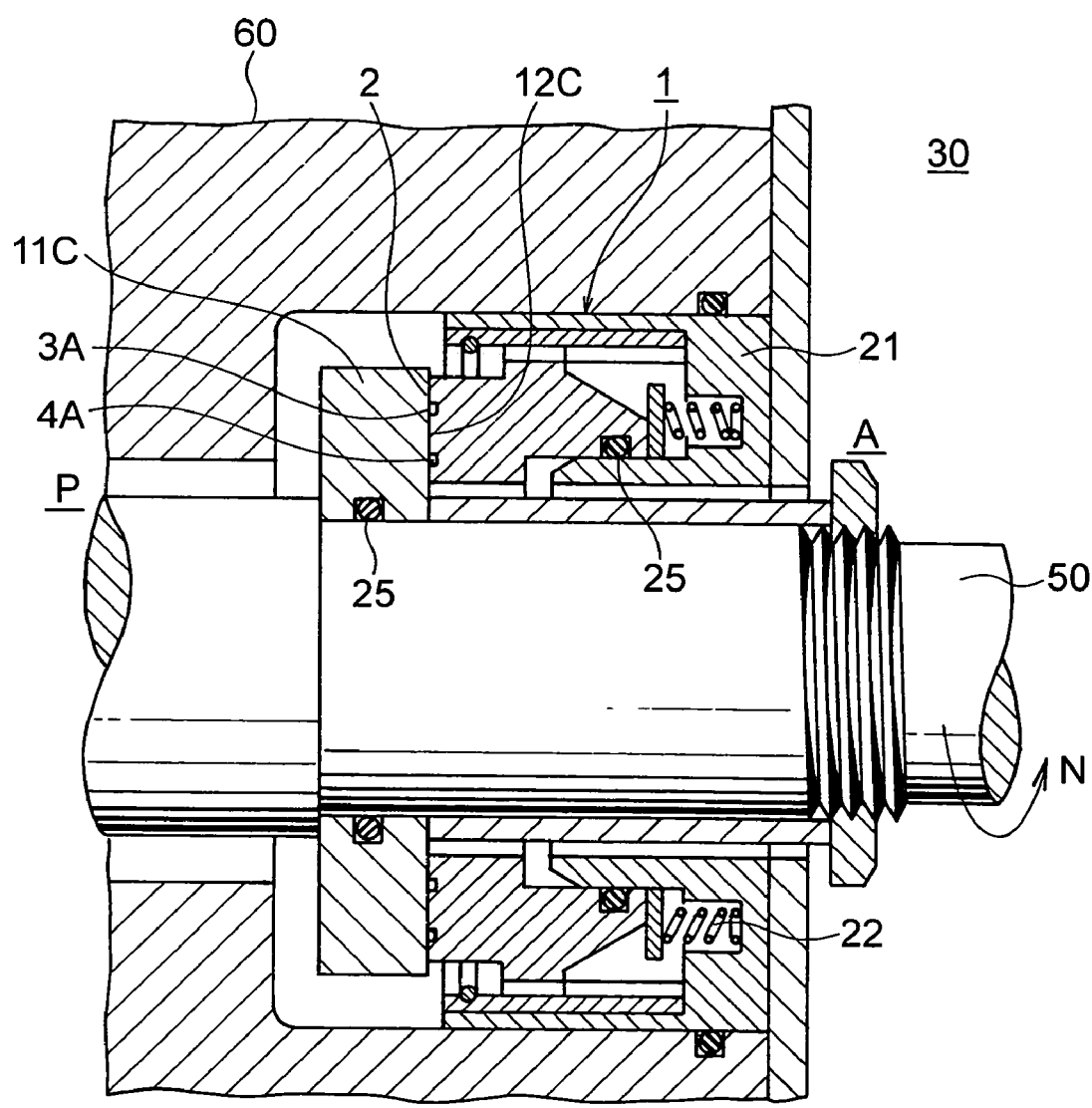
FIG. 18 is a cross-sectional view of a mechanical seal mounting a sliding element of the present invention and a mating sliding element.

FIG. 18 illustrates a first example of a mechanical seal 30 mounting a sliding element 1 of the present invention which is introduced in FIG. 6 through FIG. 15. The mechanical seal 30 uses the sliding element 1 of the present invention as a stationary seal ring. The sliding element 1 is mounted onto a retainer ring 21 via O-ring 25 in a freely slidable manner wherein the retainer ring 21 is fixed to the housing 60. The sliding element 1 is opposed to a rotary seal ring 11C wherein the rotary seal ring 11C is made of silicon carbide and sliding face 12 thereof has a polished plane surface. This sliding element 1 is able to provide seal between the sealed fluid side P and the atmospheric side A by being urged at the sliding face 2 against the mating sliding face 12C by means of a spring 22 in order to achieve fluid-tight seal. The sliding face 2 of the sliding element 1 retains the first dimple section 4A and the second dimple section 3A thereat, which not only can improve seal capability of the sliding face 2 but also can effectively reduce the friction coefficient.

Figure 19:
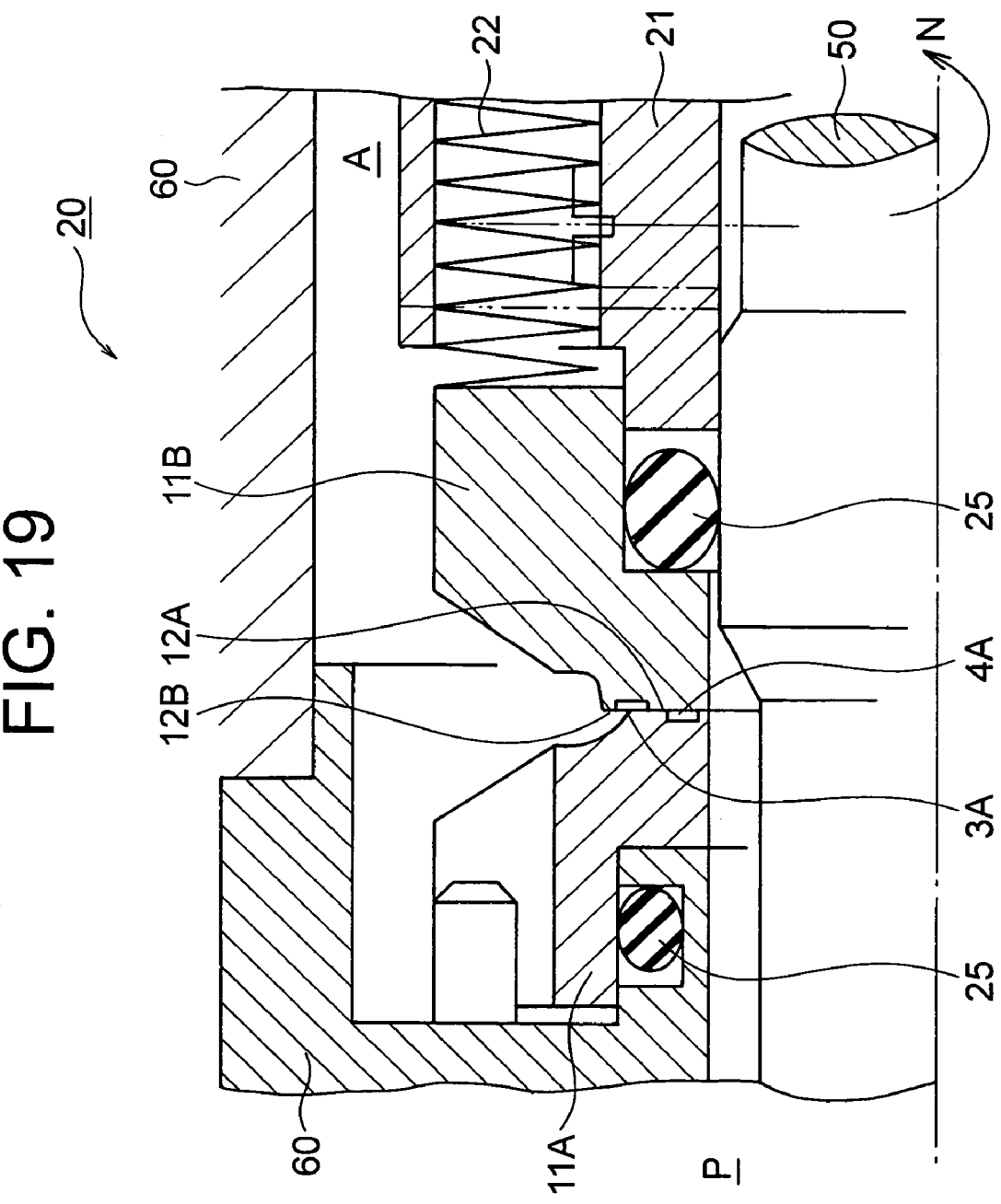
FIG. 19 is a half-section view of a mechanical seal mounting a sliding element of the present invention and a mating sliding element.

FIG. 19 illustrates a second example of a mechanical seal 20 mounting sliding elements 11A, 11B of the present invention which are introduced in FIG. 16 through FIG. 17.

The mechanical seal 20 uses the sliding element 11B of the present invention as a rotary seal ring. The sliding element 11B is mounted onto a retainer ring in a freely slidable manner wherein an O-ring 25 is used to seal between the sliding element 11B and a rotary shaft 50. Sliding face 12B of the sliding element 11B is opposed to the sliding face 12A of the sliding element 11A wherein the sliding element 11A is made of silicon carbide and serves as a stationary seal ring being mounted onto the housing 60 via O-ring. The sliding face 12B of the sliding element 11B is brought into seal contact with the opposing sliding face 12A by being urged by a spring means 22. The sliding element 11B retains the second dimple section 3A thereat while the sliding element 11A retains the first dimple section 4A thereat. This configuration can provide a low friction coefficient as well as a high seal capability.

Unlike simple spiral grooves, the dimple sections 4A, 3A disposed in the above mentioned sliding faces 2, 12A, 12B serve as a discharge means 4 and a suction means 3, respectively, wherein the former is realized by the first dimple section 4A and the latter by the second dimple section 3A. The combination of the first dimple section 4A and the second dimple section 3A can significantly improve the seal capability and decrease the friction coefficient thereof.

It has already been mentioned that a sliding element 1 of the present invention can be used in a mechanical seal device, shaft bearing, sliding ring and so son. When it is deployed in a mechanical seal device in particular, the sliding element 1, 11A, 11B can be used as either stationary seal ring or rotary seal ring or both. When the sliding element is used for either one of a pair of seal rings, a sliding face of the other seal ring may be arranged as a flat sliding face. When the element is utilized for a shaft bearing, it serves as a sliding face of the sliding element 1 which sustains a radial or thrust load exerted upon the shaft. In particular, if a lubricant is located axially inboard relative to the shaft, the inclination angles $\alpha$ and $\beta$ of the individual dimple sections 3A, 4A, respectively, are so arranged that the lubricant is pumped towards the lubrication side.

Figure 20:
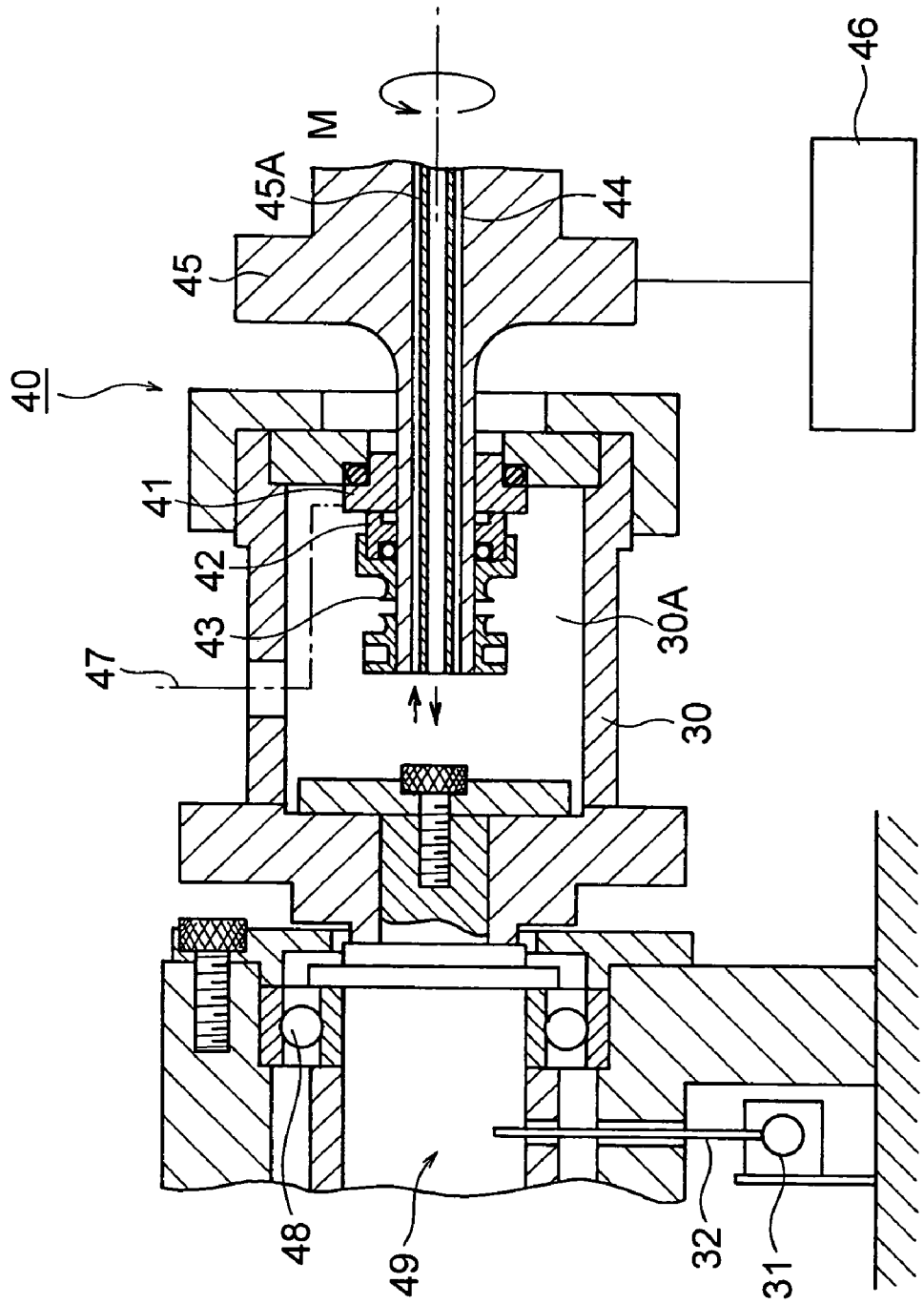
FIG. 20 is a cross-sectional view of a test apparatus evaluating a sliding element of the present invention and other sliding elements as reference examples.

FIG. 20 is a cross-sectional view of a testing apparatus 40 for evaluating a sliding element 1 related to the present invention. In FIG. 20, a testing apparatus 40 for sliding element disposes a rotatable cylindrical housing 30 in the center of the apparatus 40. A stationary seal ring 41 is sealingly fitted to an installation surface in a fluid chamber 30A within the housing 30 via O-ring. Retainer 43 being fixed to the rotary shaft 45 resiliently urges a rotary seal ring 42 by means of a spring in an axially movable manner. The contact between a seal face of the rotary seal ring 42 and an opposing seal face of the stationary seal ring 41 provides a fluid-tight seal so that the fluid in the fluid chamber 30A does not leak to the exterior.

The apparatus 40 disposes a rotary shaft 45 driven by a motor 46 and there is a flow passage 45A along the axis of the shaft 45. Inside the flow passage 45A is disposed a communication passage 44 which is a through passage. A sealed fluid such as oil is provided from the passage 44 into the fluid chamber 30A and ejected to the exterior through the flow passage 45A. External ends of the flow passage 45A and communication passage 44 are connected to a circulation pipe and a pump apparatus connected to the pipe controls a fluid circulation with a specified temperature and pressure. Also a speed of the motor 46 is controlled by an inverter which is not shown in the figure.

The housing 30 retaining the stationary seal ring 41 is fixedly connected to a shaft 49 which is supported by a bearing 48 in a freely rotatable manner. Therefore, the housing 30 is arranged in such a manner that the housing 30 is allowed to rotate due to the rotary sliding friction between the stationary seal ring 41 and the rotary seal ring.

A hole whose diameter is 2 mm is disposed in 1 mm away from the opposing seal face of the stationary seal ring 41 and the hole is connected to an end of a conductive line 47 such as PlatinumRhodium-Platinum or Alumel-Chromel which other end is connected to a thermo-electric thermometer, not shown. Temperature of the sliding face of the stationary seal ring 41 is measured by the thermo-electric thermometer.

Support block which supports the shaft 49 is equipped with a load cell 31 and a sliding torque M can be measured by way of a cantilever 32. Friction coefficient F then is computed from the sliding torque M. Its deriving formula is $F=M/(W \times Rm)$ where W is a load and Rm is an average radius of the sliding face.

This testing apparatus 40 is internal-flow, unbalancing type, and the seal face 2 is urged by the fluid pressure and a resiliently urging force of a spring. In case of a zero fluid pressure, the sliding face is urged by the spring of the retainer 43 alone. Measured items by this testing apparatus include the sliding torque M of the sliding element 1, temperature of the sliding face, fluid temperature and a volume of the fluid leaking through the sliding face.

EXAMPLE 1

A. Examples of the Sliding Elements Related to the Present Invention.

1) Rotary Sliding Elements 1 of the Present Invention are Shown in FIG. 6 through FIG. 17 stated earlier.
   (A) Example 1-A and example 1-B are referred to as example 1.
   (B) Example 2-A and example 2-B are referred to as example 2.
   (C) Example 3-A and example 3-B are referred to as example 3.
   (D) Example 4-A and example 4-B are referred to as example 4.
   (E) Example 5-A and example 5-B are referred to as example 5.
   Experiments were conducted with the above sliding elements 1. An opposed stationary sliding element which comes into sealing contact with the above rotary sliding element 1 has a flat sliding face being made of silicon carbide (a pair of the sliding faces in contact should be referred to FIG. 18). Note that a form of the individual dimple sections 4A, 3A of the sliding face 2 is based on those given in FIG. 2, FIG. 3, FIG. 5.

2) The Sliding Element 1 is Tested by the Testing Apparatus 40 Displayed in FIG. 20.

3) Dimensions of the Sliding Element 1
   A. A rotary seal ring is a sliding element made of silicon carbide (inner diameter 25 mm, outer diameter 44 mm, length 12 mm),
   B. A stationary seal ring is a sliding element made of silicon carbide (inner diameter 28 mm, outer diameter 50 mm, length 14 mm),
   C. Size of the sliding face is 33 mm in inner diameter and 39 mm in outer diameter,
   D. Sliding elements as shown in FIG. 6 and FIG. 17 are used for the experiments, E. Width of the dimple sections 4A, 3A is $250 \times 10^{-6}$ m, the length in the range of from $1600 \times 10^{-6}$ m to $5000 \times 10^{-6}$ m, and the depth $8 \times 10^{-6}$ m, F. The angle α of the first dimple section 4A is in the range of from 15 to 55 degrees while the angle β of the second dimple section 3A is also in the range of from 15 to 55 degrees.

4) Surface Roughness of the Sliding Face is Rz $0.2 \times 10^{-6}$ m,

5) Flatness is no more than 1 Band (Helium Light),

6) Testing Duration is 30 Minutes,

7) Temperature of the fluid is 30 degree Celsius,

8) Fluid pressure is 0.3 MPa, 0.5 MPa or 1.0 MPa,

9) Tangential velocity is 1.0 m/s,

10) Spring load is 20N,

11) Fluid is Super Multi Oil 10 manufactured by IDEMITSU Co., Ltd.

B. Sliding Element of the Reference Example 1.

1) Sliding element of the reference example 1 is made of the same material as that used in the sliding element 1 of FIG. 1. Unlike FIG. 1 and FIG. 2, however, the sliding face in the reference example 1 disposes V-shaped spiral grooves by connecting the both dimple sections through after eliminating the first dam section 6. The V-shaped groove makes an angle to the tangential line in the direction of rotation wherein the angles α and β are both 30 degrees. On the other hand, an opposing sliding face mating with the above sliding face has a flat surface.

2) Sliding element of the reference example 2 brings the sliding face of the sliding element 1 in FIG. 2 into seal contact with an opposing sliding face which has a polished mirror surface, being made of the same material. The reference example 2 is used to obtain a friction coefficient, since the reference example 1 does not allow such a measurement therewith. However, the friction coefficient obtained from the plane surface can serve as a basis for reference.

Figure 26:
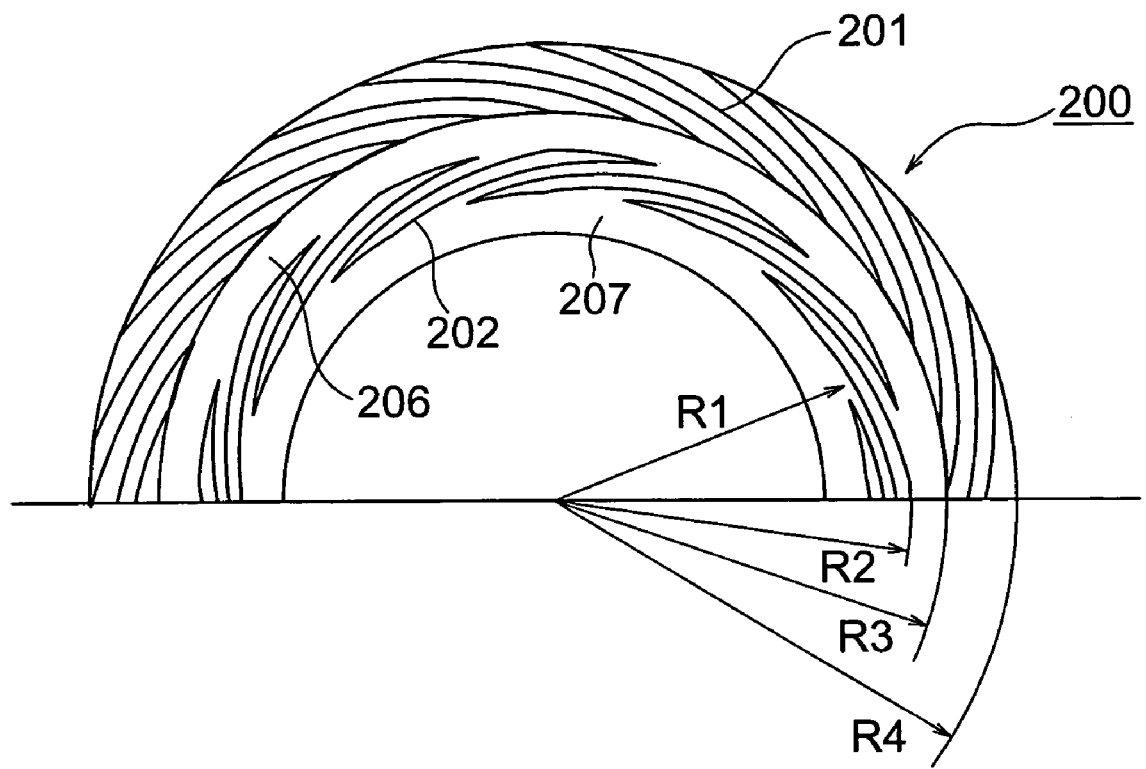
FIG. 26 is a half portion of a front view of a sliding face of a sliding element representing a patent reference 2.

3) Sliding element of the reference example 3 is made of the same material as that used in the sliding element 1 of FIG. 1. The sliding face, like a seal face 207 of FIG. 26, disposes spiral grooves in more or less a symmetric manner on both sides of the plane section 206. The spiral groove makes an angle to the tangential line in the direction of rotation wherein the angles are both 30 degrees. On the other hand, an opposing sliding face mating with the above sliding face has a flat surface.

4) Testing Conditions are Identical with the Above Example.

C. Test Results of the Sliding Element of the Present Invention and the Reference Examples.

The following description explains the test results of the individual sliding elements 1 of the present invention as example 1, example 2, example 3, example 4, example 5, example 6 compared with the reference example 1, reference example 2 and reference example 3, wherein the tests with these examples were conducted under the above mentioned conditions.

1) Relationship Between the Sealed Fluid Pressure and the Amount of Fluid Leakage from the Sliding Face.

FIG. 21 illustrates the relationship between the sealed fluid pressure and the amount of fluid leakage from the sliding face.

(A) In FIG. 21, in case of the sealed fluid pressure at 0.3 MPa, the amount of fluid leakage of the example 1 through the example 6 is in the range of from 1.282 g/h to 1.651 g/h. Note that the least leakage amount was obtained with the example 4 while the most leakage amount was obtained with the example 5. On the other hand, fluid leakage of the reference example 1 is 2.756 g/h and that of the reference example 3 is 2.342 g/h. It has been verified from these observations that all the cases from the example 1 through the example 6 sustain less fluid leakage compared with the reference example 1 and the reference example 3 under the low fluid pressure.

(B) In FIG. 21, in case of the sealed fluid pressure at 0.5 MPa, the amount of fluid leakage of the example 1 through the example 6 is in the range of from 0.027 g/h to 0.035 g/h. Note that the least leakage amount was obtained with the example 4 while the most leakage amount was obtained with the example 5. On the other hand, fluid leakage of the reference example 1 is 1.533 g/h and that of the reference example 3 is 1.221 g/h. It has been verified from these observations that all the cases from the example 1 through the example 6 sustain substantially less fluid leakage compared with the reference example 1 and the reference example 3 under the middle fluid pressure.

(C) In FIG. 21, in case of the sealed fluid pressure at 1.0 MPa, the amount of fluid leakage of the example 1 through the example 6 is in the range of from 0.007 g/h to 0.009 g/h. Note that the least leakage amount was obtained with the example 4 while the most leakage amount was obtained with the example 5. On the other hand, fluid leakage of the reference example 1 is 0.064 g/h and that of the reference example 3 is 0.058 g/h. It has been verified from these observations that all the cases from the example 1 through the example 6 sustain substantially less fluid leakage compared with the reference example 1 and the reference example 3 under the high fluid pressure.

2) Tangential velocity of sliding face versus amount of fluid leakage from the sliding face.

Figure 22:
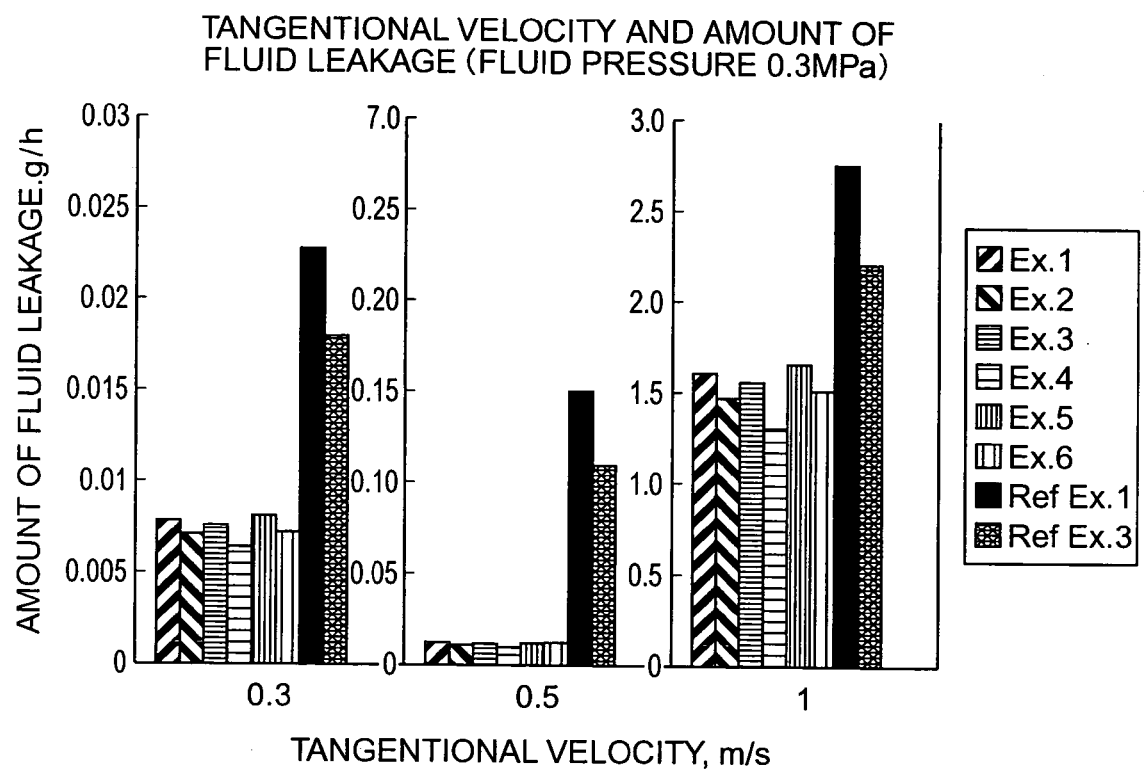
FIG. 22 is a bar chart representing tangential velocity of the sliding face versus fluid leakage obtained from the test results of the individual sliding elements 1 of the present invention and the other sliding elements, reference example 1 and reference example 3.

FIG. 22 illustrates how the amount of fluid leakage from the sliding face changes as the tangential velocity of sliding face increases.

(A) In FIG. 22, in case of the tangential velocity of the sliding face at 0.3 m/s, the amount of fluid leakage of the example 1 through the example 6 is in the range of from 0.006 g/h to 0.008 g/h. Note that the least leakage amount was obtained with the example 4 while the most leakage amount was obtained with the example 5. On the other hand, fluid leakage of the reference example 1 is 0.022 g/h and that of the reference example 3 is 0.018 g/h. It has been verified from these observations that all the cases from the example 1 through the example 6 sustain substantially less fluid leakage compared with the reference example 1 and the reference example 3 under the low tangential velocity.

(B) In FIG. 22, in case of the tangential velocity of the sliding face at 0.5 m/s, the amount of fluid leakage of the example 1 through the example 6 is in the range of from 0.009 g/h to 0.012 g/h. Note that the least leakage amount was obtained with the example 4 while the most leakage amount was obtained with the example 5. On the other hand, fluid leakage of the reference example 1 is 0.150 g/h and that of the reference example 3 is 0.110 g/h. It has been verified from these observations that all the cases from the example 1 through the example 6 sustain substantially less fluid leakage compared with the reference example 1 and the reference example 3 under the middle tangential velocity.

(C) In FIG. 22, in case of the tangential velocity of the sliding face at 1.0 m/s, the amount of fluid leakage of the example 1 through the example 6 is in the range of from 1.298 g/h to 1.651 g/h. Note that the least leakage amount was obtained with the example 4 while the most leakage amount was obtained with the example 5. On the other hand, fluid leakage of the reference example 1 is 2.756 g/h and that of the reference example 3 is 2.213 g/h. It has been verified from these observations that all the cases from the example 1 through the example 6 sustain substantially less fluid leakage compared with the reference example 1 and the reference example 3 under the high tangential velocity.

3) Sealed fluid pressure versus friction coefficient of sliding face.

Figure 23:
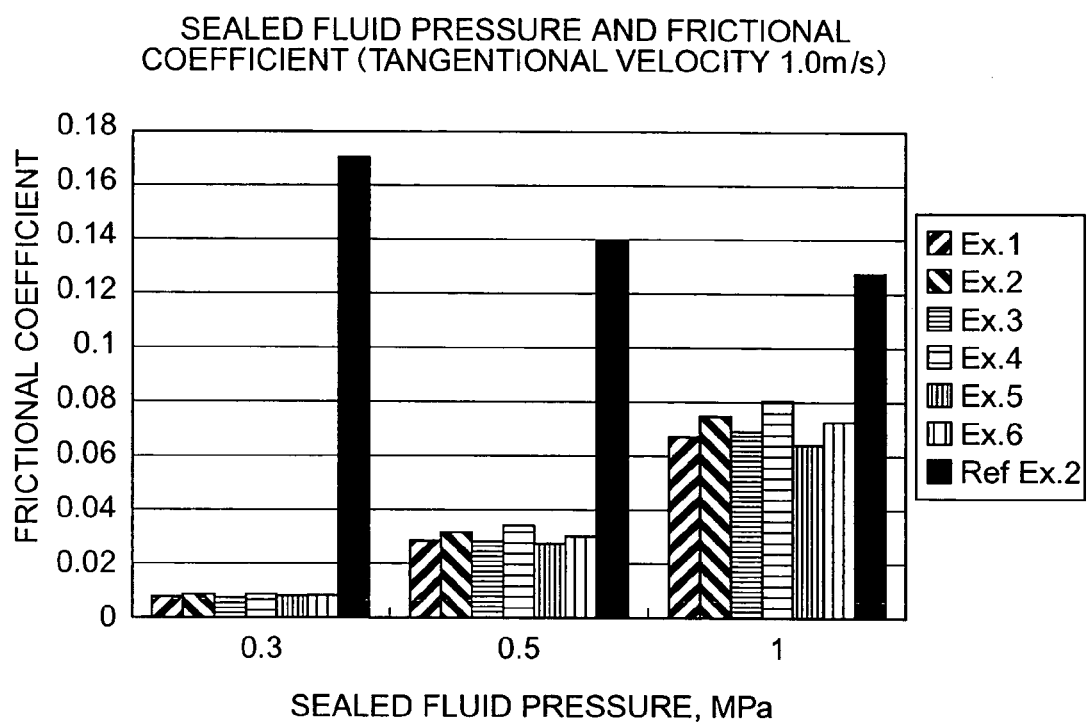
FIG. 23 is a bar chart representing sealed fluid pressure versus fluid leakage obtained from the test results of the individual sliding elements 1 of the present invention and the other sliding element as reference example 2.

(A) FIG. 23 illustrates the relationship between the sealed fluid pressure and the friction coefficient of sliding face. In FIG. 23, in case of the sealed fluid pressure at 0.3 MPa, the friction coefficient of the example 1 through the example 6 is in the range of from 0.0073 to 0.0091. Note that the smallest coefficient was obtained with the example 5 while the largest coefficient was obtained with the example 4. On the other hand, friction coefficient of the reference example 2 is 0.1703. It has been verified from these observations that all the cases from the example 1 through the example 6 sustain smaller friction coefficients compared with the reference example 2 under the low fluid pressure.

(B) In FIG. 23, in case of the sealed fluid pressure at 0.5 MPa, the friction coefficient of the example 1 through the example 6 is in the range of from 0.0257 to 0.0341. Note that the smallest coefficient was obtained with the example 5 while the largest coefficient was obtained with the example 2. On the other hand, friction coefficient of the reference example 2 is 0.1406. It has been verified from these observations that all the cases from the example 1 through the example 6 sustain smaller friction coefficients compared with the reference example 2 under the middle fluid pressure.

(C) In FIG. 23, in case of the sealed fluid pressure at 1.0 MPa, the friction coefficient of the example 1 through the example 6 is in the range of from 0.0645 to 0.0815. Note that the smallest coefficient was obtained with the example 5 while the largest coefficient was obtained with the example 4. On the other hand, friction coefficient of the reference example 2 is 0.1286. It has been verified from these observations that all the cases from the example 1 through the example 6 sustain smaller friction coefficients compared with the reference example 2 under the high fluid pressure.

4) Tangential velocity of sliding face versus friction coefficient of sliding face.

Figure 24:
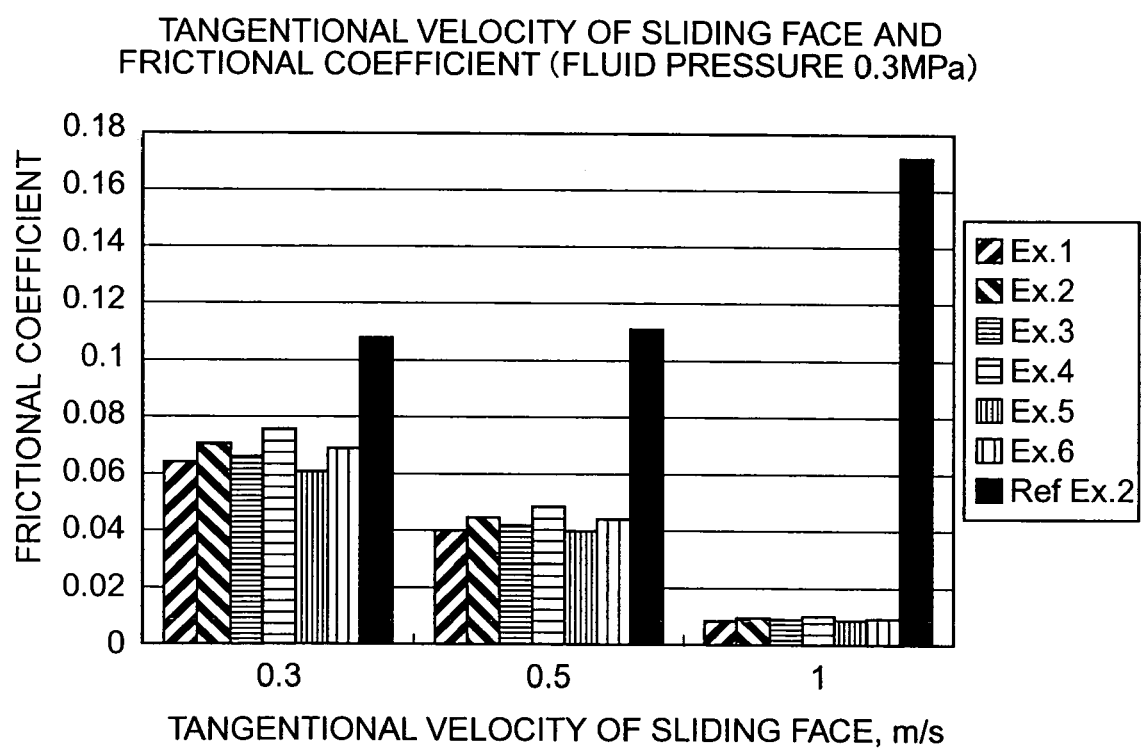
FIG. 24 is a bar chart representing tangential velocity of the sliding face versus fluid leakage obtained from the test results of the individual sliding elements 1 of the present invention and the other sliding element as reference example 2.
Figure 25:
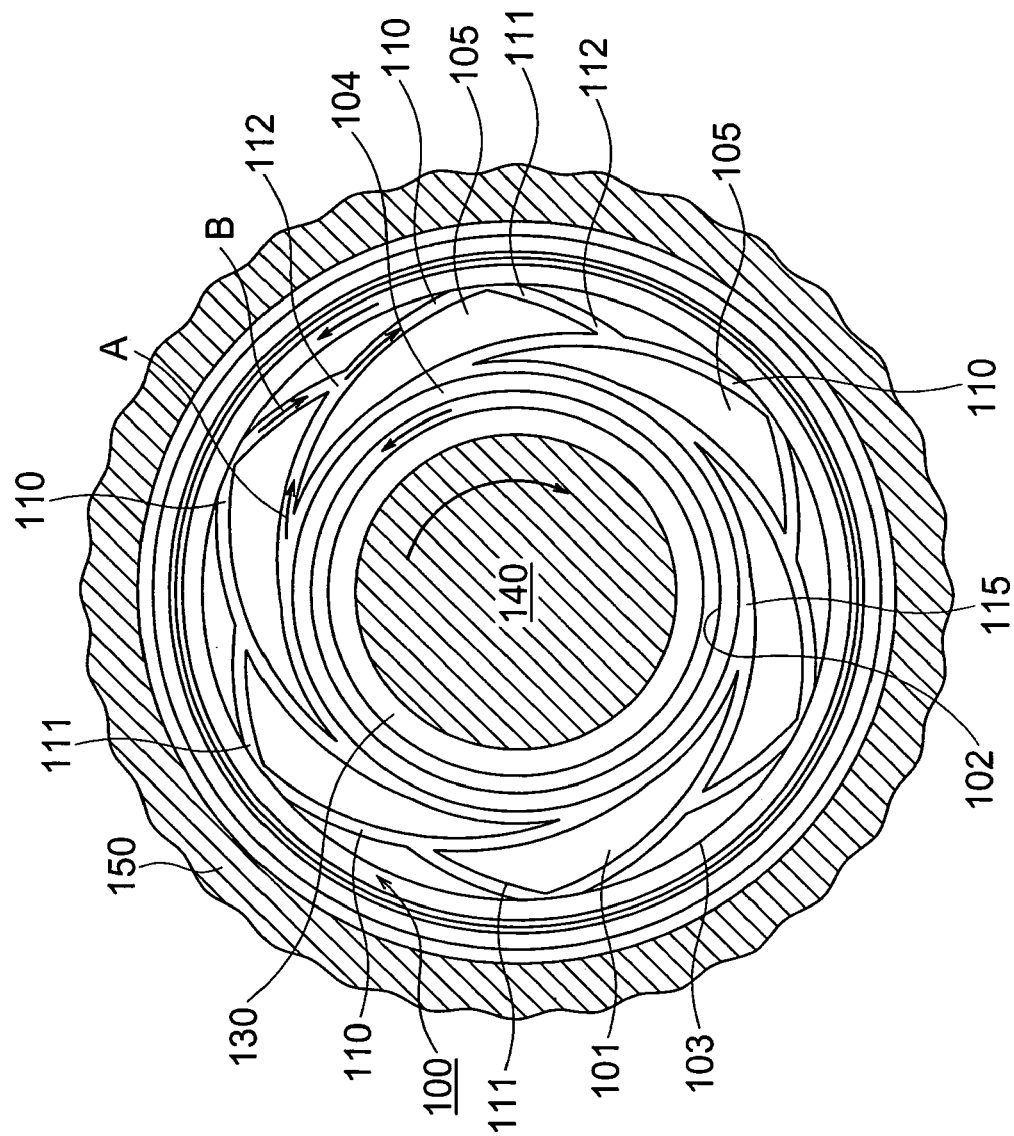
FIG. 25 is a front view of a sliding face of a sliding element representing a patent reference 1.

(A) FIG. 24 illustrates how the friction coefficient of the sliding face changes as the tangential velocity of sliding face increases. In FIG. 24, in case of the tangential velocity of the sliding face at 0.3 m/s, the friction coefficient of the example 1 through the example 6 is in the range of from 0.0605 to 0.0752. Note that the smallest coefficient was obtained with the example 5 while the largest coefficient was obtained with the example 4. On the other hand, friction coefficient of the reference example 2 is 0.1065. It has been verified from these observations that all the cases from the example 1 through the example 6 sustain smaller friction coefficients compared with the reference example 2 under the low tangential velocity.

(B) In FIG. 24, in case of the tangential velocity of the sliding face at 0.5 m/s, the friction coefficient of the example 1 through the example 6 is in the range of from 0.0391 to 0.0444. Note that the smallest coefficient was obtained with the example 5 while the largest coefficient was obtained with the example 4. On the other hand, friction coefficient of the reference example 2 is 0.1093. It has been verified from these observations that all the cases from the example 1 through the example 6 sustain smaller friction coefficients compared with the reference example 2 under the middle tangential velocity.

(C) In FIG. 24, in case of the tangential velocity of the sliding face at 1.0 m/s, the friction coefficient of the example 1 through the example 6 is in the range of from 0.0077 to 0.0095. Note that the smallest coefficient was obtained with the example 5 while the largest coefficient was obtained with the example 4. On the other hand, friction coefficient of the reference example 2 is 0.1703. It has been verified from these observations that all the cases from the example 1 through the example 6 sustain smaller friction coefficients compared with the reference example 2 under the high tangential velocity.

The above described sliding element 1 assumes that the sealed fluid is located in its outer circumferential side. Similar advantages, however, will be achieved even when the sealed fluid is located in the inner circumferential side. No drawing is provided for such a swapped case, but it should have a similar configuration to FIG. 1 and FIG. 5 as far as its appearance is concerned. FIG. 3 should be considered in such a way that the first dimple section 4A and the second dimple section 3A are swapped with one another. In this case, the seal face 7 located in the inner circumference of the sliding face 2 becomes a 0-th dam section 8. Therefore, the previous 0-th dam section 8 now becomes a seal face 7.

According to a sliding element related to the present invention, a sealed fluid is introduced into a sliding face 2 of the sliding element by means of a suction means 3 which is disposed in the fluid side of the sliding face 2. The sealed fluid thus introduced is accumulated in first dimple sections 4A and second dimple sections 3A with a help of a first dam section all of which are disposed on the sliding face 2. At the same time, a discharge means 4 acts to push back the sealed fluid toward the fluid side, since the fluid is effectively prevented from leaking through a seal face 7. In particular, the disposition of the dam sections 6, 6A, 6B make a significant contribution to the improvement of the seal capability. Thus an outstanding seal performance of the sliding element is exhibited against the sealed fluid. Also in the normal pressure range where typical machines are utilized, this sliding element can effect superb seal against sealed fluid.

Described below are preferred examples of other inventions related to the current invention.

Sliding element 1 of a preferred embodiment as the second invention relating to the practice of the present invention arranges the inclination angle α of the first dimple section 4A relative to the first dam section 6 to be no more than the inclination angle β of the second dimple section 3A relative to the first dam section 6.

In the sliding element 1 related to the second invention, since the inclination angle α of the first dimple section 4A is arranged to be no more than the inclination angle β of the second dimple section 3A, the fluid introduced to between the mating sliding faces 2 is pushed back toward the second dimple section 3A side due to the counter-flow pumping action of the first dimple section 4A. And the first dam section 6 prevents the sealed fluid from flowing into the first dimple section 4A side and keeps the fluid on the sliding face 2 in an effective manner. Therefore, a reduction in the friction coefficient as well as an improvement in the seal capability can be achieved.

Sliding element 1 of a preferred embodiment as the third invention relating to the practice of the present invention configures the groove width in such a manner that the groove width of the first dimple section 4A and the second dimple section 3A gradually increases from the radially inboard side to the radially outboard side.

In the sliding element 1 related to the third invention, since the first dimple section 4A and the second dimple section 3A have a wider groove width in their outboard direction, more incentive action for introducing the fluid into the sliding face 2 and more significant pumping action for pushing back the fluid can be expected. And a careful design of the first dimple section 4A, the second dimple section 3A and the first dam section 6 disposed therebetween permits an optimal control of the fluid amount kept on the sliding face 2. Also when the sliding face 2 is disposed at an end surface of the sliding element 1, if the width between the adjacent grooves in the first dimple section 4A or the second dimple section 3A is kept constant, the groove width of the corresponding dimple section needs to increase from the radially inboard side to the radially outboard side. This fabrication can be made with high precision since it is fabricated based on an angle measured with respect to the circular center of the sliding face 2.

Sliding element 1 of a preferred embodiment as the fourth invention relating to the practice of the present invention configures the inclination angles α and β of the first dimple section 4A and the second dimple section 3A, respectively, to be in the range of from 15 to 55 degrees.

In the sliding element 1 related to the fourth invention, the first dimple section 4A and the second dimple section 3A are arranged in a "V"-form or a quasi-"V"-form wherein the two dimple sections 4A, 3A have an offset in the circumferential direction. Since the inclination angles α and β of the first dimple section 4A and the second dimple section 3A, respectively, are designed in the range of from 15 to 55 degrees, the sealed fluid is urged to be introduced into the sliding face 2 with rotation thereof. Also the pumping action urging the counter-flow of the sealed fluid brings a lubrication effect to the sliding face 2. As the result, an outstanding seal capability can be obtained.

Sliding element 1 of a preferred embodiment as the fifth invention relating to the practice of the present invention configures sliding face 2 thereof in such a manner that an annular dam section 6 circumferentially transverses the first dimple section 4A and/or the second dimple section 3A.

In the sliding element 1 related to the fifth invention, since the annular dam section 6 is disposed on sliding face thereof transversing the first dimple section 4A and/or the second dimple section 3A, the dam section 6 acts not only to regulate the intake of the sealed fluid into the sliding face 2 but also to preserve the fluid thereon. The dam section 6 also acts to distribute the sealed fluid over the sliding face 2. Therefore, presence of the dam section 6 not only improves the seal capability but also decreases the friction coefficient.

Sliding element 1 of a preferred embodiment as the sixth invention relating to the practice of the present invention is configured in such a manner that a tip portion at the radially fluid side of the second dimple section 3A protrudes toward the same fluid side beyond the periphery of the sliding face 2 of the opposed mating sliding element 1.

In the sliding element 1 related to the sixth invention, the tip portion of the second dimple section 3A of sliding face 2 thereof is permitted to come into contact with the sealed fluid by making the diameter of a mating sliding face 2 relatively smaller with no need of extending the second dimple section 3A to the periphery of the sliding face 2. This effectively prevents a potential damage of the second dimple section 3A disposed in the sliding face 2 during its sliding engagement wherein the sliding face 2 is made of a brittle material such as silicon carbide. At the same time, this allows an easy intake of the sealed fluid from the uncovered tip portion of the second dimple section 3A into the sliding face. Therefore, with the rotation of the sliding face 2, the sealed fluid is more effectively introduced into the sliding face 2 from the tip portion of the second dimple section 3A.

As stated above, the sliding element of the present invention can be utilized for a sliding portion in industrial applications such as mechanical seal, shaft bearing or the like. In particular, the sliding element is very effective as a seal ring or a shaft bearing in that it is able to decrease the friction coefficient of the sliding face by preserving a lubrication fluid thereon and also that leakage of the lubrication fluid from the sliding face is prevented. Thus, the sliding element brings two advantages, reduction in the friction coefficient and better seal capability.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A sliding element that keeps a sealed fluid on a sliding face of said sliding element, said sliding element being slidable relative to another sliding element, said sealed fluid being located in either inner circumferential side or outer circumferential side of said sliding face, said sliding element comprising:
   a) a first dam section being configured in an annular form on said sliding face;
   b) a second dimple section having a form of a narrow second groove and making an inclination angle (β) measured from said dam section in a direction of rotation pointing toward said sealed fluid;
   c) suction means including an annularly arranged array of said second dimple sections;
   d) a first dimple section having a form of a narrow first groove and making an inclination angle (α) measured from said first dam section in a direction of rotation but pointing an opposite direction relative to said suction means;
   e) discharge means including an annularly arranged array of said first dimple sections; and
   f) seal face being disposed in a peripheral surface adjacent to said discharge means and in the opposite side relative to said dam section,
   wherein said first dimple section is located at a low pressure side, said second dimple section is located at a high pressure side, wherein a longitudinal length of said first groove of said first dimple section is greater than a longitudinal length of said second groove of said second dimple section, and wherein a second dam section in an annular form circumferentially traverses said second dimple section, and wherein a third dam section in an annular form circumferentially traverses an intermediate portion of said first dimple section.

2. The sliding element as in claim 1 wherein the inclination angle $\alpha$ of the first dimple section is arranged no more than the inclination angle ($\beta$) of the second dimple section.

3. The sliding element as in claim 1 wherein the groove width of said first dimple section and said second dimple section gradually increases from the radially inboard side to the radially outboard side.

4. The sliding element as in claim 1 wherein the inclination angle ($\alpha$) of said first dimple section is in the range of from 15 to 55 degrees and the inclination angle ($\beta$) of said second dimple section is in the range of from 15 to 55 degrees.

5. The sliding element as in claim 3 wherein the inclination angle ($\alpha$) of said first dimple section is in the range of from 15 to 55 degrees and the inclination angle ($\beta$) of said second dimple section is in the range of from 15 to 55 degrees.

6. The sliding element as in claim 1 wherein a tip portion at radially fluid side of said second dimple section protrudes toward the same fluid side beyond the periphery of an opposed mating sliding face of a mating sliding element.

* * * * *